United States Patent
Barnes et al.

(10) Patent No.: US 12,545,726 B1
(45) Date of Patent: Feb. 10, 2026

(54) COMPOSITIONS AND METHODS RELATED TO GPRC5D BINDING AGENTS AND VARIANTS THEREOF

(71) Applicant: Integral Molecular, Inc., Philadelphia, PA (US)

(72) Inventors: Trevor Barnes, Philadelphia, PA (US); Hayley Roth, Philadelphia, PA (US); Joseph B. Rucker, Philadelphia, PA (US); Ross Chambers, Philadelphia, PA (US); Benjamin J. Doranz, Philadelphia, PA (US)

(73) Assignee: Integral Molecular, Inc., Philadelphia, PA (US)

( * ) Notice: Subject to any disclaimer, the term of this patent is extended or adjusted under 35 U.S.C. 154(b) by 0 days.

(21) Appl. No.: 19/276,860

(22) Filed: Jul. 22, 2025

(51) Int. Cl.
*C07K 16/28* (2006.01)

(52) U.S. Cl.
CPC ........ *C07K 16/28* (2013.01); *C07K 2317/565* (2013.01); *C07K 2317/622* (2013.01)

(58) Field of Classification Search
None
See application file for complete search history.

(56) References Cited

U.S. PATENT DOCUMENTS

| | | |
|---|---|---|
| 1,281,162 A | 10/1918 | Holloway |
| 10,562,968 B2 | 2/2020 | Attar et al. |
| 11,685,777 B2 | 6/2023 | Attar et al. |
| 11,884,722 B2 | 1/2024 | Attar et al. |
| 12,077,592 B2 | 9/2024 | Attar et al. |
| 2018/0037651 A1 | 2/2018 | Attar et al. |
| 2020/0231686 A1 | 7/2020 | Attar et al. |
| 2020/0262915 A1* | 8/2020 | Chambers ............ A61K 40/11 |
| 2021/0054094 A1 | 2/2021 | Fertig et al. |
| 2021/0393689 A1 | 12/2021 | Sather et al. |
| 2022/0259318 A1 | 8/2022 | Bujotzek et al. |
| 2022/0267438 A1 | 8/2022 | Attar et al. |
| 2022/0411491 A1 | 12/2022 | Bernasconi et al. |
| 2023/0084967 A1 | 3/2023 | Attar et al. |
| 2023/0203160 A1 | 6/2023 | Li et al. |
| 2023/0212308 A1 | 7/2023 | Fertig et al. |
| 2023/0227548 A1 | 7/2023 | Attar et al. |
| 2024/0041929 A1 | 2/2024 | Belmont et al. |
| 2024/0067749 A1 | 2/2024 | Fertig et al. |
| 2024/0262921 A1 | 8/2024 | Attar et al. |
| 2024/0343796 A1 | 10/2024 | Attar et al. |
| 2025/0049852 A1 | 2/2025 | Tan et al. |
| 2025/0057950 A1 | 2/2025 | He et al. |
| 2025/0121064 A1 | 4/2025 | Zhou et al. |
| 2025/0145705 A1 | 5/2025 | Fu et al. |
| 2025/0188163 A1 | 6/2025 | Heidrich et al. |
| 2025/0215083 A1 | 7/2025 | Shi et al. |

FOREIGN PATENT DOCUMENTS

| | | |
|---|---|---|
| WO | 2018/017786 A3 | 3/2018 |
| WO | 2019/154890 A1 | 8/2019 |
| WO | 2021/018925 A1 | 2/2021 |
| WO | 2021/018859 A3 | 5/2021 |
| WO | 2022/175255 A3 | 9/2022 |
| WO | 2022/247756 A1 | 12/2022 |
| WO | 2023/078382 A1 | 5/2023 |
| WO | 2023/115347 A1 | 6/2023 |
| WO | 2023/116782 A1 | 6/2023 |
| WO | 2023/125888 A1 | 7/2023 |
| WO | 2023/143537 A1 | 8/2023 |
| WO | 2023/169555 A1 | 9/2023 |
| WO | 2023/174238 A1 | 9/2023 |
| WO | 2023/227062 A1 | 11/2023 |
| WO | 2023/236889 A1 | 12/2023 |
| WO | 2024/046239 A1 | 3/2024 |
| WO | 2024/050797 A1 | 3/2024 |
| WO | 2024/192704 A1 | 9/2024 |
| WO | 2025/011462 A1 | 1/2025 |
| WO | 2025/056013 A1 | 3/2025 |
| WO | 2025/122929 A1 | 6/2025 |
| WO | 2025/134049 A1 | 6/2025 |
| WO | 2025/134050 A1 | 6/2025 |

OTHER PUBLICATIONS

Sanchez et al. (Abstract 6305: Bispecific claudin 18.2 and GPRC5D antibodies with potent cell-killing activity for cancer therapeutics, Cancer Res Apr. 1, 2023; 83 (7_Supplement): 6305) (Year: 2023).*
Deng, et al., "Enhancing antibody patent protection using epitope mapping information," mAbs, 10:2, 204-209, (2018), DOI:10.1080/19420862.2017.1402998.
Banik, et al., "Redefining antibody patent protection using paratope mapping and CDR-scanning," Nature Biotechnology, vol. 43, pp. 170-174 (2025).
Chari, et al., "Talquetamab, a T-Cell-Redirecting GPRC5D Bispecific Antibody for Multiple Myeloma," N Engl J Med, 2022, vol. 387, No. 24, DOI: 10.1056/NEJMoa2204591.
Smith, et al., "GPRC5D is a target for the immunotherapy of multiple myeloma with rationally designed CAR T cells," Sci Transl Med., 2019, DOI: 10.1126/scitranslmed.aau7746.
Yan, et al., "The binding mechanism of an anti-multiple myeloma antibody to the human GPRC5D homodimer," Nature Communications, 2024, DOI: https://doi.org/10.1038/s41467-024-49625-y.
Tomita, et al., "A novel T cell-redirecting anti-GPRC5DxCD3 bispecifc antibody with potent antitumor activity in multiple myeloma preclinical models," Scientific Reports, (2024) 14:5135, DOI: https://doi.org/10.1038/s41598-024-55143-0.

* cited by examiner

*Primary Examiner* — Peter J Reddig
(74) *Attorney, Agent, or Firm* — Morgan, Lewis & Bockius LLP

(57) ABSTRACT

The present disclosure describes compositions and methods related to GPRC5D binding agents.

14 Claims, 4 Drawing Sheets
Specification includes a Sequence Listing.

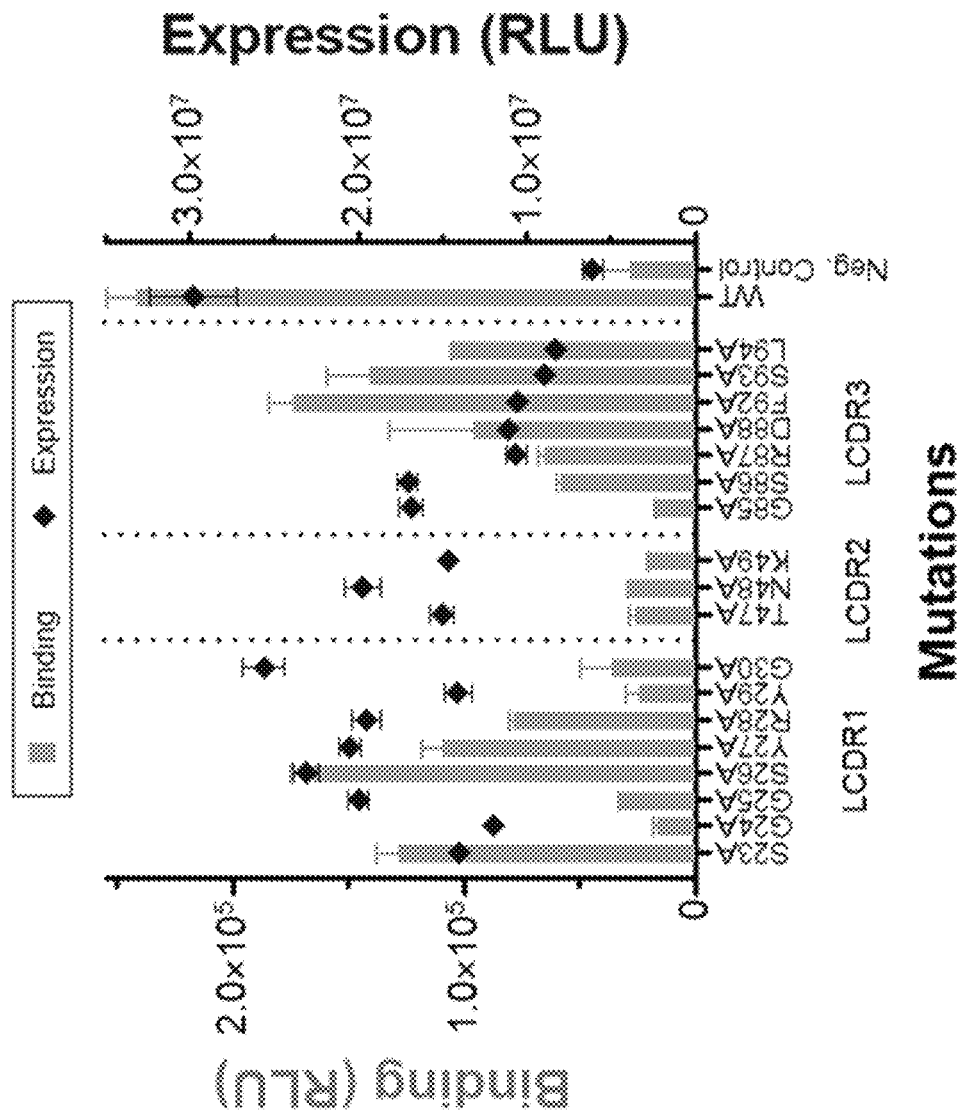

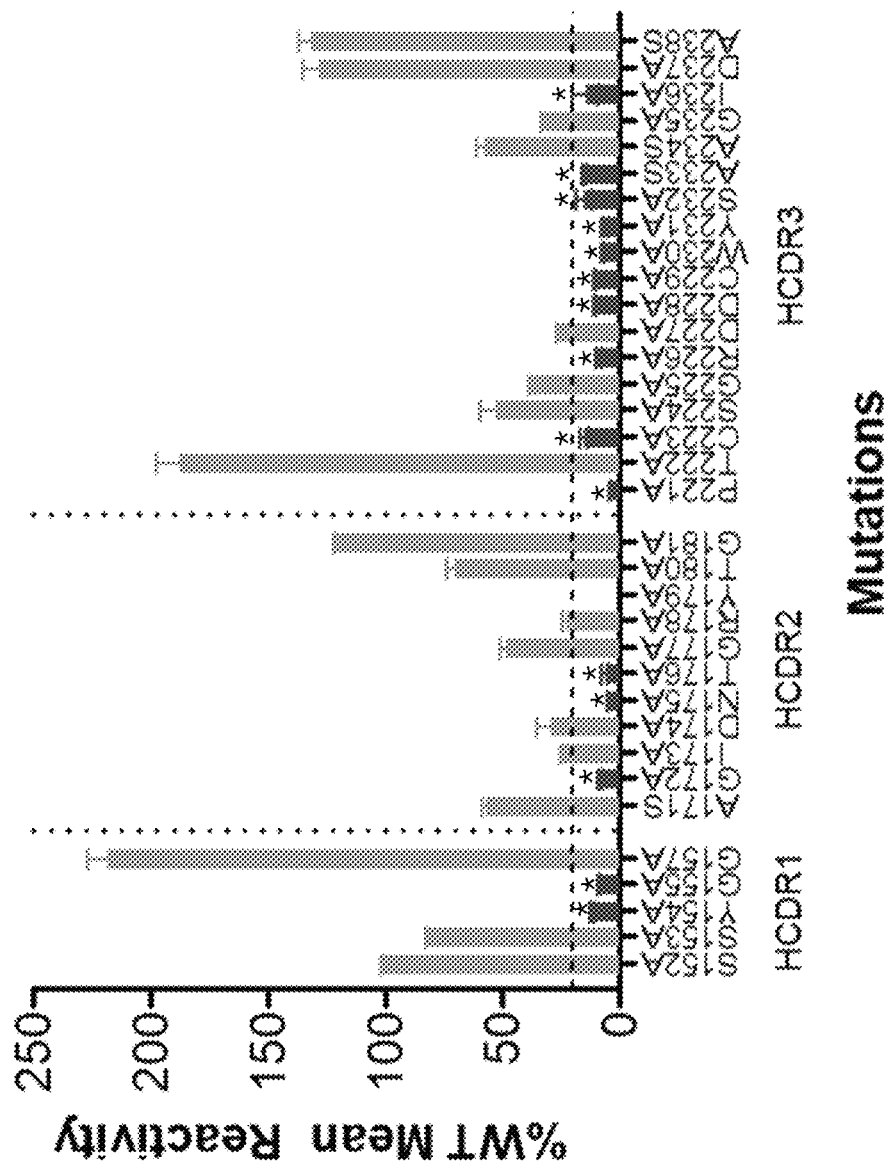

COMPOSITIONS AND METHODS RELATED TO GPRC5D BINDING AGENTS AND VARIANTS THEREOF

FIELD

The present technology relates to compositions and methods related to GPRC5D binding agents, including comprehensive variants thereof.

DESCRIPTION OF THE TEXT FILE SUBMITTED ELECTRONICALLY

The instant application contains a sequence listing, which has been submitted in XML format via EFS-Web. The contents of the XML copy named "INM-009_122086-5009_Sequence_Listing," which was created on Jul. 15, 2025 and is 8,016 bytes in size, the contents of which are incorporated herein by reference in their entirety.

BACKGROUND

Antibody discovery and characterization remains an important process in therapeutic development, particularly in the search for novel antibodies that show high specificity and efficacy against target antigens. However, this process encounters challenges that necessitate multifaceted approaches to overcome. One of the principal problems is the difficulty of accurately identifying residues within the complementarity-determining regions (CDRs) of antibodies that significantly affect binding affinity. Variations in these residues can lead to inconsistent binding behaviors, complicating predictions regarding how mutations might affect antibody efficacy. In addition, current antibody discovery methods are often incomplete and can be limited by technical variability, which makes it difficult to draw meaningful correlations between genetic modifications and resultant biological activity. This limitation is compounded by the observed heterogeneity in antibody affinity, which arises during the selection processes within germinal centers.

For example, G-protein-coupled receptor family C group 5 member D (GPRC5D), is a receptor that has shown restricted expression in malignant plasma cells associated with multiple myeloma (MM), while showing limited presence in other normal tissues. This unique expression profile makes GPRC5D an attractive target for therapeutic interventions, particularly in the context of developing monoclonal antibodies and bispecific T-cell engagers aimed at treating MM. While the high prevalence of GPRC5D on the surface of malignant cells positions it as a potential biomarker and therapeutic target, generating effective antibodies against this receptor presents significant challenges. For instance, one difficulty arises from its structural properties and binding mechanisms, which are not fully understood. Also, the receptor can exist in a homodimeric state, complicating antibody design due to potential conformational changes when targeting such a structure. Furthermore, early-stage research on GPRC5D means that the downstream signaling pathways and endogenous ligands remain largely unknown, complicating predictions about the therapeutic performance of these antibodies.

Therefore, there is an urgent need for compositions and methods that accurately identify and characterize novel antibodies related to GPRC5D. Such compositions and methods are important for defining the residues of a novel GPRC5D antibody that contact the target antigen, which are needed to identify variants of the GPRC5D antibody that enhance binding or expression for potential antibody engineering applications.

SUMMARY

Therefore, the present disclosure provides compositions and methods related to a novel G protein-coupled receptor class C group 5 member D (GPRC5D) antibody, and several functional variants thereof.

In aspects, disclosed herein is an antibody that binds to GPRC5D comprising a heavy chain variable region (HVR) and light chain variable region (LVR), wherein:
(a) the HVR comprises HCDR1, HCDR2, and HCDR3, wherein:
  (1) the HCDR1 comprises an amino acid sequence of $X_1X_2X_3X_4X_5X_5$, wherein:
    $X_1$ is an amino acid selected from A, D, E, F, G, H, I, K, L, M, Q, R, S, T, V, W and Y;
    $X_2$ is an amino acid selected from F, G, I, K, L, M, N, Q, T, V and Y;
    $X_3$ is G;
    $X_4$ is M;
    $X_5$ is an amino acid selected from A, C, D, E, G, H, I, K, L, M, P, Q, S, T and V; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 4;
  (2) the HCDR2 comprises an amino acid sequence of $X_1X_2X_3X_4X_5X_6X_7X_8X_9X_{10}X_{11}YGSAVKG$, wherein:
    $X_1$ is an amino acid selected from A, G, I, L, M, N, Q, S, T and V;
    $X_2$ is G;
    $X_3$ is an amino acid selected from A, C, E, G, I, M, Q, S, T and V;
    $X_4$ is an amino acid selected from A, C, D and N;
    $X_5$ is N;
    $X_6$ is an amino acid selected from C, I, T, V and W;
    $X_7$ is an amino acid selected from A, G, S and T;
    $X_8$ is an amino acid selected from A, G, H, I, K, L, M, N, R and S;
    $X_9$ is an amino acid selected from F, H and Y;
    $X_{10}$ is an amino acid selected from A, C, D, E, F, G, H, I, K, L, M, N, Q, R, S, T, V, W and Y;
    $X_{11}$ is an amino acid selected from A, C, D, E, F, G, H, I, K, L, M, N, Q, R, S, T, V and Y; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 5;
  (3) the HCDR3 comprises an amino acid sequence of $X_1X_2X_3X_4X_5X_6X_7X_8X_9X_{10}X_{11}X_{12}X_{13}X_{14}X_{15}X_{16}X_{17}X_{18}$, wherein:
    $X_1$ is P;
    $X_2$ is an amino acid selected from A, C, F, H, I, K, L, M, N, Q, R, S, T and W;
    $X_3$ is C;

X4 is an amino acid selected from A, E, F, G, H, I, L, M, N, Q, R, S, T, V, W and Y;
X5 is an amino acid selected from A, G, M, N, Q, R, S and T;
X6 is an amino acid selected from I and R;
X7 is an amino acid selected from A, C, D, E, F, G, H, S, W and Y;
X8 is an amino acid selected from D, E, I, L, M, Q, R, S, T and V;
X9 is C;
X10 is W;
X11 is Y;
X12 is an amino acid selected from Q, R and S;
X13 is A;
X14 is an amino acid selected from A, G and S;
X15 is an amino acid selected from A, G and S;
X16 is an amino acid selected from F, I, Q, V and Y;
X17 is an amino acid selected from A, C, D, E, F, G, H, I, L, M, P, Q, R, S, T, V, W and Y;
X18 is an amino acid selected from A, E, F, G, I, K, L, M, N, Q, R, S, T, V and Y; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 6;

(b) the LVR comprises LCDR1, LCDR2, LCDR3, wherein:

(1) the LCDR1 comprises an amino acid sequence of X1X2X3X4X5X6X7X8, wherein:
X1 is an amino acid selected from A, D, E, F, G, H, I, K, L, M, N, Q, R, S, T, V, W and Y;
X2 is G;
X3 is an amino acid selected from G, P, R, S, T and V;
X4 is an amino acid selected from A, D, E, F, G, H, I, K, L, M, N, P, Q, R, S, T, V, W and Y;
X5 is an amino acid selected from A, D, F, G, H, I, K, L, M, Q, R, S, T, V, W and Y;
X6 is an amino acid selected from A, G, H, I, K, L, M, N, Q, R, S, T and V;
X7 is an amino acid selected from D, F, H, I, K, M, P, Q, R, T, V, W and Y;
X8 is an amino acid selected from G, R and S; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 1;

(2) the LCDR2 comprises an amino acid sequence of X1X2X3X4RPS, wherein:
X1 is an amino acid selected from G, I, K, N, P, R, S and V;
X2 is an amino acid selected from D, E, G, H, I, K, N, R, S, T, V and W;
X3 is an amino acid selected from C, D, F, G, H, I, K, M, N, Q, R, S, T, V, W and Y;
X4 is an amino acid selected from F, G, H, K, L, M, N, Q, R, S, V and Y; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 2;

(3) the LCDR3 comprises an amino acid sequence of X1X2X3X4X5X6X7X8X9X10, wherein:
X1 is an amino acid selected from F, G and Y;
X2 is an amino acid selected from A, E, G, H, I, K, L, Q, R, S and T;
X3 is an amino acid selected from A, G, H, I, L, Q, R, S, T, V, W and Y;
X4 is an amino acid selected from A, C, D, E, F, G, K, L, M, N, P, R, T, V, W and Y;
X5 is an amino acid selected from D, E, F, G, H, I, K, L, S, V, W and Y;
X6 is an amino acid selected from C, D, E, F, G, H, I, K, L, N, R, S, T, V, W and Y;
X7 is an amino acid selected from F, G, H, K, L, N, Q, R, S, T, W and Y;
X8 is an amino acid selected from A, C, D, E, F, G, H, I, K, N, Q, R, S, T, W and Y;
X9 is an amino acid selected from A, C, G, I, K, L, P, S, T and V;
X10 is an amino acid selected from A, C, F, G, H, I, K, L, M, N, Q, R, S, T, W and Y; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 3.

In this aspect, the antibody that binds to GPRC5D may have at least a 20% increase in binding reactivity compared to the binding reactivity of a wild-type GPRC5D antibody.

In embodiments, X1 of HCDR1 is an amino acid selected from H, K, S, W, and Y. In embodiments, X2 of HCDR1 is an amino acid selected from F, I, L, and Y. In embodiments, X3 of HCDR1 is G. In embodiments, X4 of HCDR1 is M. In embodiments, X5 of HCDR1 is an amino acid selected from A, D, G, I, L, M, and S.

In embodiments, X1 of HCDR2 is an amino acid selected from G and M. In embodiments, X2 of HCDR2 is G. In embodiments, X3 of HCDR2 is I. In embodiments, X4 of HCDR2 is D. In embodiments, X6 of HCDR2 is an amino acid selected from I, T, and V. In embodiments, X7 of HCDR2 is G. In embodiments, X9 of HCDR2 is Y. In embodiments, X10 of HCDR2 is an amino acid selected from F, H, K, M, N, S, T, W, and Y. In embodiments, X11 of HCDR2 is an amino acid selected from A, G, I, K, L, M, N, Q, R, S, and T.

In embodiments, X1 of HCDR3 is P. In embodiments, X2 of HCDR3 is an amino acid selected from A, F, H, I, K, L, M, R, S, and T. In embodiments, X3 of HCDR3 is Y. In embodiments, X4 of HCDR3 is S. In embodiments, X5 of HCDR3 is T. In embodiments, X6 of HCDR3 is R. In embodiments, X7 of HCDR3 is an amino acid selected from D, G, W, and Y. In embodiments, X8 of HCDR3 is an amino acid selected from D, L, and T. In embodiments, X9 of HCDR3 is C. In embodiments, X10 of HCDR3 is W. In embodiments, X12 of HCDR3 is S. In embodiments, X13 of HCDR3 is A. In embodiments, X14 of HCDR3 is A. In embodiments, X15 of HCDR3 is G. In embodiments, X16 of HCDR3 is I. In embodiments, X17 of HCDR3 is an amino acid selected from A, D, E, H, I, L, M, Q, and V. In embodiments, X18 of HCDR3 is an amino acid selected from I, K, Q, S, T, and V.

In embodiments, X1 of LCDR1 is an amino acid selected from K, S, and T. In embodiments, X4 of LCDR1 is an amino acid selected from H, I, L, N, Q, T, and V. In embodiments, X5 of LCDR1 is G. In embodiments, X7 of LCDR1 is an amino acid selected from K, T, V, W, and Y. In embodiments, X8 of LCDR1 is G.

In embodiments, X1 of LCDR2 is an amino acid selected from G and S. In embodiments, X2 of LCDR2 is an amino acid selected from N, S, and T. In embodiments, X3 of LCDR2 is an amino acid selected from F, H, R, S, W, and Y. In embodiments, X4 of LCDR2 is K.

In embodiments, X1 of LCDR3 is G. In embodiments, X2 of LCDR3 is an amino acid selected from G and S. In embodiments, X3 of LCDR3 is R. In embodiments, X4 of LCDR3 is an amino acid selected from D, N and T. In embodiments, X5 of LCDR3 is an amino acid selected from G and H. In embodiments, X6 of LCDR3 is an amino acid selected from H, K, R, S, and T. In embodiments, X7 of LCDR3 is Y. In embodiments, X8 of LCDR3 is an amino acid selected from A, E, G, H, I, K, N, Q, R, S, T, and Y. In embodiments, X9 of LCDR3 is an amino acid selected from A, G, P, S, and V. In embodiments, X10 of LCDR3 is an amino acid selected from A, L, M, S, and T.

In aspects, disclosed herein is an antibody that binds to GPRC5D comprising a heavy chain variable region (HVR) and light chain variable region (LVR), wherein:
(a) the HVR comprises HCDR1, HCDR2, and HCDR3, wherein
  (1) the HCDR1 comprises an amino acid sequence of X1X2X3X4X5, wherein
    X1 is an amino acid selected from A, D, E, F, G, H, I, K, L, M, Q, R, S, T, V, W and Y;
    X2 is an amino acid selected from F, G, I, K, L, M, N, Q, T, V and Y;
    X3 is G;
    X4 is M;
    X5 is an amino acid selected from A, C, D, E, G, H, I, K, L, M, P, Q, S, T and V; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 4;
  (2) the HCDR2 comprises an amino acid sequence of X1X2X3X4X5X6X7X8X9X10X11YGSAVKG, wherein
    X1 is an amino acid selected from A, G, L, M and S;
    X2 is G;
    X3 is an amino acid selected from I, M and V;
    X4 is D;
    X5 is N;
    X6 is an amino acid selected from I, T and V;
    X7 is an amino acid selected from G and S;
    X8 is an amino acid selected from G, H and R;
    X9 is Y;
    X10 is an amino acid selected from A, D, F, H, I, K, L, M, N, Q, R, S, T, V, W and Y;
    X11 is an amino acid selected from A, E, G, H, I, K, L, M, N, Q, R, S, T and V; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 5;
  (3) the HCDR3 comprises an amino acid sequence of X1X2X3X4X5X6X7X8X9X10X11X12X13X14X15X16X17X18, wherein
    X1 is P;
    X2 is an amino acid selected from A, F, H, I, K, L, M, N, Q, R, S and T;
    X3 is C;
    X4 is an amino acid selected from A, E, H, L, M, R, S and T;
    X5 is an amino acid selected from G, S and T;
    X6 is R;
    X7 is an amino acid selected from D, E, G, W and Y;
    X8 is an amino acid selected from D, L, M, T and V;
    X9 is C;
    X10 is W;
    X11 is Y;
    X12 is S;
    X13 is A;
    X14 is an amino acid selected from A and S;
    X15 is G;
    X16 is I;
    X17 is an amino acid selected from A, D, E, G, H, I, L, M, Q, R, S, T, V and Y;
    X18 is an amino acid selected from A, E, G, I, K, L, M, N, Q, R, S, T and V; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 6;
(b) the LVR comprises LCDR1, LCDR2, LCDR3, wherein
  (1) the LCDR1 comprises an amino acid sequence of X1X2X3X4X5X6X7X8, wherein
    X1 is an amino acid selected from A, E, F, H, I, K, L, M, N, Q, R, S, T, V, W and Y;
    X2 is G;
    X3 is G;
    X4 is an amino acid selected from A, F, G, H, I, K, L, M, N, P, Q, R, S, T, V, W and Y;
    X5 is an amino acid selected from A, F, G, H, S, T, W and Y;
    X6 is an amino acid selected from G, K, R and S;
    X7 is an amino acid selected from F, K, T, V, W and Y;
    X8 is G; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 1;
  (2) the LCDR2 comprises an amino acid sequence of X1X2X3X4RPS, wherein X1 is an amino acid selected from G, I, K, N, R and S;

X2 is an amino acid selected from G, N, S and T;

X3 is an amino acid selected from F, G, H, K, N, R, S, T, V, W and Y;

X4 is an amino acid selected from H, K and R; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 2;

(3) the LCDR3 comprises an amino acid sequence of X1X2X3X4X5X6X7X8X9X10, wherein X1 is G;

X2 is an amino acid selected from G and S;

X3 is an amino acid selected from A, H, I, L, R, S, V, W and Y;

X4 is an amino acid selected from A, D, G, K, N and T;

X5 is an amino acid selected from D, E, F, G, H, I, K, L, S, V, W and Y;

X6 is an amino acid selected from D, E, F, G, H, K, L, N, R, S, T, V and Y;

X7 is an amino acid selected from F, S S and Y;

X8 is an amino acid selected from A, C, D, E, F, G, H, I, K, N, Q, R, S, T, W and Y;

X9 is an amino acid selected from A, C, G, I, P, S and V;

X10 is an amino acid selected from A, I, L, M, N, Q, S and T; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 3.

In this aspect, the antibody that binds to GPRC5D may have at least a 50% increase in binding reactivity compared to the binding reactivity of a wild-type GPRC5D antibody.

In embodiments, X1 of HCDR1 is an amino acid selected from H, K, S, W, and Y. In embodiments, X2 of HCDR1 is an amino acid selected from F, I, L, and Y. In embodiments, X3 of HCDR1 is G. In embodiments, X4 of HCDR1 is M. In embodiments, X5 of HCDR1 is an amino acid selected from A, D, G, I, L, M, and S.

In embodiments, X1 of HCDR2 is an amino acid selected from G and M. In embodiments, X2 of HCDR2 is G. In embodiments, X3 of HCDR2 is I. In embodiments, X4 of HCDR2 is D. In embodiments, X6 of HCDR2 is an amino acid selected from 1, T, and V. In embodiments, X7 of HCDR2 is G. In embodiments, X9 of HCDR2 is Y. In embodiments, X10 of HCDR2 is an amino acid selected from F, H, K, M, N, S, T, W, and Y. In embodiments, X11 of HCDR2 is an amino acid selected from A, G, I, K, L, M, N, Q, R, S, and T.

In embodiments, X1 of HCDR3 is P. In embodiments, X2 of HCDR3 is an amino acid selected from A, F, H, I, K, L, M, R, S, and T. In embodiments, X3 of HCDR3 is Y. In embodiments, X4 of HCDR3 is S. In embodiments, X5 of HCDR3 is T. In embodiments, X6 of HCDR3 is R. In embodiments, X7 of HCDR3 is an amino acid selected from D, G, W, and Y. In embodiments, X8 of HCDR3 is an amino acid selected from D, L, and T. In embodiments, X9 of HCDR3 is C. In embodiments, X10 of HCDR3 is W. In embodiments, X12 of HCDR3 is S. In embodiments, X13 of HCDR3 is A. In embodiments, X14 of HCDR3 is A. In embodiments, X15 of HCDR3 is G. In embodiments, X16 of HCDR3 is I. In embodiments, X17 of HCDR3 is an amino acid selected from A, D, E, H, I, L, M, Q, and V. In embodiments, X18 of HCDR3 is an amino acid selected from I, K, Q, S, T, and V.

In embodiments, X1 of LCDR1 is an amino acid selected from K, S, and T. In embodiments, X4 of LCDR1 is an amino acid selected from H, I, L, N, Q, T, and V. In embodiments, X5 of LCDR1 is G. In embodiments, X7 of LCDR1 is an amino acid selected from K, T, V, W, and Y. In embodiments, X8 of LCDR1 is G.

In embodiments, X1 of LCDR2 is an amino acid selected from G and S. In embodiments, X2 of LCDR2 is an amino acid selected from N, S, and T. In embodiments, X3 of LCDR2 is an amino acid selected from F, H, R, S, W, and Y. In embodiments, X4 of LCDR2 is K.

In embodiments, X1 of LCDR3 is G. In embodiments, X2 of LCDR3 is an amino acid selected from G and S. In embodiments, X3 of LCDR3 is R. In embodiments, X4 of LCDR3 is an amino acid selected from D, N and T. In embodiments, X5 of LCDR3 is an amino acid selected from G and H. In embodiments, X6 of LCDR3 is an amino acid selected from H, K, R, S, and T. In embodiments, X7 of LCDR3 is Y. In embodiments, X8 of LCDR3 is an amino acid selected from A, E, G, H, I, K, N, Q, R, S, T, and Y. In embodiments, X9 of LCDR3 is an amino acid selected from A, G, P, S, and V. In embodiments, X10 of LCDR3 is an amino acid selected from A, L, M, S, and T.

In aspects, disclosed herein is an antibody that binds to GPRC5D comprising a heavy chain variable region (HVR) and light chain variable region (LVR), wherein (a) the HVR comprises HCDR1, HCDR2, and HCDR3, wherein:

(1) the HCDR1 comprises an amino acid sequence of X1X2X3X4X5, wherein

X1 is an amino acid selected from A, D, E, F, G, H, I, K, L, M, Q, R, S, T, V, W and Y;

X2 is an amino acid selected from F, G, I, K, L, M, N, Q, T, V and Y;

X3 is G;

X4 is M;

X5 is an amino acid selected from A, C, D, E, G, H, I, K, L, M, P, Q, S, T and V; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 4;

(2) the HCDR2 comprises an amino acid sequence of X1X2X3X4X5X6X7X8X9X10X11YGSAVKG, wherein:

X1 is an amino acid selected from A, G and M;

X2 is G;

X3 is I;

X4 is D;

X5 is N;

X6 is an amino acid selected from I, T and V;

X7 is G;

X8 is R;

X9 is Y;
X10 is an amino acid selected from F, H, K, L, M, N, S, T, V, W and Y;
X11 is an amino acid selected from A, E, G, I, K, L, M, N, Q, R, S and T; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 5;

(3) the HCDR3 comprises an amino acid sequence of X1X2X3X4X5X6X7X8X9X10X11X12X13X14-X15X16X17X18, wherein:
X1 is P;
X2 is an amino acid selected from A, F, H, I, K, L, M, N, Q, R, S and T;
X3 is C;
X4 is S;
X5 is an amino acid selected from G and T;
X6 is R;
X7 is an amino acid selected from D, E, G, W and Y;
X8 is an amino acid selected from D, L and T;
X9 is C;
X10 is W;
X11 is Y;
X12 is S;
X13 is A;
X14 is A;
X15 is G;
X16 is I;
X17 is an amino acid selected from A, D, E, G, H, I, L, M, Q, S and V;
X18 is an amino acid selected from A, I, K, Q, S, T and V; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 6;

(b) the LVR comprises LCDR1, LCDR2, LCDR3, wherein:
(1) the LCDR1 comprises an amino acid sequence of X1X2X3X4X5X6X7X8, wherein:
X1 is an amino acid selected from H, I, K, M, Q, S, T and V;
X2 is G;
X3 is G;
X4 is an amino acid selected from F, G, H, I, K, L, M, N, Q, R, S, T, V and W;
X5 is an amino acid selected from G and Y;
X6 is an amino acid selected from K and R;
X7 is an amino acid selected from F, K, T, V, W and Y;
X8 is G; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 1;

(2) the LCDR2 comprises an amino acid sequence of X1X2X3X4RPS, wherein:
X1 is an amino acid selected from G, I and S;
X2 is an amino acid selected from G, N, S and T;
X3 is an amino acid selected from F, H, K, N, R, S, T, W and Y;
X4 is an amino acid selected from K and R; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 2;

(3) the LCDR3 comprises an amino acid sequence of X1X2X3X4X5X6X7X8X9X10, wherein:
X1 is G;
X2 is an amino acid selected from G and S;
X3 is an amino acid selected from L, R, S and Y;
X4 is an amino acid selected from D, N and T;
X5 is an amino acid selected from D, F, G, H, K, L and S;
X6 is an amino acid selected from G, H, K, L, N, R, S and T;
X7 is Y;
X8 is an amino acid selected from A, D, E, F, G, H, I, K, N, Q, R, S, T and Y;
X9 is an amino acid selected from A, G, I, P, S and V;
X10 is an amino acid selected from A, L, M, S and T; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 3.

In this aspect, the antibody that binds to GPRC5D may have at least a 80% increase in binding reactivity compared to the binding reactivity of a wild-type GPRC5D antibody.

In embodiments, X1 of HCDR1 is an amino acid selected from H, K, S, W, and Y. In embodiments, X2 of HCDR1 is an amino acid selected from F, I, L, and Y. In embodiments, X3 of HCDR1 is G. In embodiments, X4 of HCDR1 is M. In embodiments, X5 of HCDR1 is an amino acid selected from A, D, G, I, L, M, and S.

In embodiments, X1 of HCDR2 is an amino acid selected from G and M. In embodiments, X2 of HCDR2 is G. In embodiments, X3 of HCDR2 is I. In embodiments, X4 of HCDR2 is D. In embodiments, X6 of HCDR2 is an amino acid selected from I, T, and V. In embodiments, X7 of HCDR2 is G. In embodiments, X9 of HCDR2 is Y. In embodiments, X10 of HCDR2 is an amino acid selected from F, H, K, M, N, S, T, W, and Y. In embodiments, X11 of HCDR2 is an amino acid selected from A, G, I, K, L, M, N, Q, R, S, and T.

In embodiments, X1 of HCDR3 is P. In embodiments, X2 of HCDR3 is an amino acid selected from A, F, H, I, K, L, M, R, S, and T. In embodiments, X3 of HCDR3 is Y. In embodiments, X4 of HCDR3 is S. In embodiments, X5 of HCDR3 is T. In embodiments, X6 of HCDR3 is R. In embodiments, X7 of HCDR3 is an amino acid selected from D, G, W, and Y. In embodiments, X8 of HCDR3 is an amino acid selected from D, L, and T. In embodiments, X9 of HCDR3 is C. In embodiments, X10 of HCDR3 is W. In embodiments, X12 of HCDR3 is S. In embodiments, X13 of HCDR3 is A. In embodiments, X14 of HCDR3 is A. In embodiments, X15 of HCDR3 is G. In embodiments, X16 of HCDR3 is I. In embodiments, X17 of HCDR3 is an amino acid selected from A, D, E, H, I, L, M, Q, and V. In embodiments, X18 of HCDR3 is an amino acid selected from I, K, Q, S, T, and V. In embodiments, X1 of LCDR1 is an amino acid selected from K, S, and T.

In embodiments, X4 of LCDR1 is an amino acid selected from H, I, L, N, Q, T, and V. In embodiments, X5 of LCDR1 is G. In embodiments, X7 of LCDR1 is an amino acid selected from K, T, V, W, and Y. In embodiments, X8 of LCDR1 is G.

In embodiments, X1 of LCDR2 is an amino acid selected from G and S. In embodiments, X2 of LCDR2 is an amino acid selected from N, S, and T. In embodiments, X3 of LCDR2 is an amino acid selected from F, H, R, S, W, and Y. In embodiments, X4 of LCDR2 is K.

In embodiments, X1 of LCDR3 is G. In embodiments, X2 of LCDR3 is an amino acid selected from G and S. In embodiments, X3 of LCDR3 is R. In embodiments, X4 of LCDR3 is an amino acid selected from D, N and T. In embodiments, X5 of LCDR3 is an amino acid selected from G and H. In embodiments, X6 of LCDR3 is an amino acid selected from H, K, R, S, and T. In embodiments, X7 of LCDR3 is Y. In embodiments, X8 of LCDR3 is an amino acid selected from A, E, G, H, I, K, N, Q, R, S, T, and Y. In embodiments, X9 of LCDR3 is an amino acid selected from A, G, P, S, and V. In embodiments, X10 of LCDR3 is an amino acid selected from A, L, M, S, and T.

In aspects, disclosed herein is an antibody that binds to GPRC5D comprising a heavy chain variable region (HVR) and light chain variable region (LVR), wherein the antibody comprises:
  a light chain variable region comprising an LCDR1, SEQ ID NO: 2 (LCDR2), and SEQ ID NO: 3 (LCDR3); and a heavy chain variable region comprising SEQ ID NO: 4 (HCDR1), SEQ ID NO: 5 (HCDR2), and SEQ ID NO: 6 (HCDR3), wherein the LCDR1 comprises an amino acid sequence of X1X2X3X4X5X6X7X8, wherein:
    X1 is an amino acid selected from H, I, K, M, Q, S, T and V;
    X2 is G;
    X3 is G;
    X4 is an amino acid selected from F, G, H, I, K, L, M, N, Q, R, S, T, V and W;
    X5 is an amino acid selected from G and Y;
    X6 is an amino acid selected from K and R;
    X7 is an amino acid selected from F, K, T, V, W and Y; and
    X8 is G; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 1.

In this aspect, the antibody that binds to GPRC5D may have at least a 80% increase in binding reactivity compared to the binding reactivity of a wild-type GPRC5D antibody.

In embodiments, X1 of LCDR1 is an amino acid selected from K, S, and T. In embodiments, X4 of LCDR1 is an amino acid selected from H, I, L, N, Q, T, and V. In embodiments, X5 of LCDR1 is G. In embodiments, X7 of LCDR1 is an amino acid selected from K, T, V, W, and Y. In embodiments, X8 of LCDR1 is G.

In aspects, disclosed herein is an antibody that binds to GPRC5D comprising a heavy chain variable region (HVR) and light chain variable region (LVR), wherein the antibody comprises:
  a light chain variable region comprising SEQ ID NO: 1 (LCDR1), an LCDR2, and SEQ ID NO: 3 (LCDR3); and a heavy chain variable region comprising SEQ ID NO: 4 (HCDR1), SEQ ID NO: 5 (HCDR2), and SEQ ID NO: 6 (HCDR3), wherein the LCDR2 comprises an amino acid sequence of X1X2X3X4RPS, wherein
    X1 is an amino acid selected from G, I and S;
    X2 is an amino acid selected from G, N, S and T;
    X3 is an amino acid selected from F, H, K, N, R, S, T, W and Y; and
    X4 is an amino acid selected from K and R; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 2.

In this aspect, the antibody that binds to GPRC5D may have at least a 80% increase in binding reactivity compared to the binding reactivity of a wild-type GPRC5D antibody.

In embodiments, X1 of LCDR2 is an amino acid selected from G and S. In embodiments, X2 of LCDR2 is an amino acid selected from N, S, and T. In embodiments, X3 of LCDR2 is an amino acid selected from F, H, R, S, W, and Y. In embodiments, X4 of LCDR2 is K.

In aspects, disclosed herein is an antibody that binds to GPRC5D comprising a heavy chain variable region (HVR) and light chain variable region (LVR), wherein the antibody comprises:
  a light chain variable region comprising SEQ ID NO: 1 (LCDR1), SEQ ID NO: 2 (LCDR2), and an LCDR3; and a heavy chain variable region comprising SEQ ID NO: 4 (HCDR1), SEQ ID NO: 5 (HCDR2), and SEQ ID NO: 6 (HCDR3), wherein the LCDR3 comprises an amino acid sequence of X1X2X3X4X5X6X7X8X9X10,
    X1 of LCDR3 is G;
    X2 of LCDR3 is an amino acid selected from G and S;
    X3 of LCDR3 is R;
    X4 of LCDR3 is an amino acid selected from D, N and T;
    X5 of LCDR3 is an amino acid selected from G and H;
    X6 of LCDR3 is an amino acid selected from H, K, R, S, and T;
    X7 of LCDR3 is Y;
    X8 of LCDR3 is an amino acid selected from A, E, G, H, I, K, N, Q, R, S, T, and Y;
    X9 of LCDR3 is an amino acid selected from A, G, P, S, and V; and
    X10 of LCDR3 is an amino acid selected from A, L, M, S, and T; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 3.

In this aspect, the antibody that binds to GPRC5D may have at least a 80% increase in binding reactivity compared to the binding reactivity of a wild-type GPRC5D antibody.

In embodiments, X1 of LCDR3 is G. In embodiments, X2 of LCDR3 is an amino acid selected from G and S. In embodiments, X3 of LCDR3 is R. In embodiments, X4 of LCDR3 is an amino acid selected from D, N and T. In embodiments, X5 of LCDR3 is an amino acid selected from G and H. In embodiments, X6 of LCDR3 is an amino acid selected from H, K, R, S, and T. In embodiments, X7 of LCDR3 is Y. In embodiments, X8 of LCDR3 is an amino acid selected from A, E, G, H, I, K, N, Q, R, S, T, and Y. In embodiments, X9 of LCDR3 is an amino acid selected from A, G, P, S, and V. In embodiments, X10 of LCDR3 is an amino acid selected from A, L, M, S, and T. In embodiments, X9 of LCDR3 is G. In embodiments, X9 of LCDR3 is P.

In aspects, disclosed herein is an antibody that binds to GPRC5D comprising a heavy chain variable region (HVR) and light chain variable region (LVR), wherein the antibody comprises:

a light chain variable region comprising SEQ ID NO: 1 (LCDR1), SEQ ID NO: 2 (LCDR2), and SEQ ID NO: 3 (LCDR3); and a heavy chain variable region comprising an HCDR1, SEQ ID NO: 5 (HCDR2), and SEQ ID NO: 6 (HCDR3), wherein the HCDR1 comprises an amino acid sequence of X1X2X3X4X5, wherein X1 is an amino acid selected from A, D, E, F, G, H, I, K, L, M, Q, R, S, T, V, W and Y;

X2 is an amino acid selected from F, G, I, K, L, M, N, Q, T, V and Y;

X3 is G;

X4 is M;

X5 is an amino acid selected from A, C, D, E, G, H, I, K, L, M, P, Q, S, T and V; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 4.

In embodiments, X1 of HCDR1 is an amino acid selected from H, K, S, W, and Y. In embodiments, X2 of HCDR1 is an amino acid selected from F, I, L, and Y. In embodiments, X3 of HCDR1 is G. In embodiments, X4 of HCDR1 is M. In embodiments, X5 of HCDR1 is an amino acid selected from A, D, G, I, L, M, and S. In embodiments, X6 of HCDR1 is A. In embodiments, X5 of HCDR1 is I. In embodiments, X5 of HCDR1 is L.

In aspects, disclosed herein is an antibody that binds to GPRC5D comprising a heavy chain variable region (HVR) and light chain variable region (LVR), wherein the antibody comprises:

a light chain variable region comprising SEQ ID NO: 1 (LCDR1), SEQ ID NO: 2 (LCDR2), and SEQ ID NO: 3 (LCDR3); and a heavy chain variable region comprising SEQ ID NO: 4 (HCDR1), an HCDR2, and SEQ ID NO: 6 (HCDR3), wherein the HCDR2 comprises an amino acid sequence of X1X2X3X4X5X6X7X8X9X10X11YGSAVKG, wherein X1 is an amino acid selected from A, G and M;

X2 is G;

X3 is I;

X4 is D;

X5 is N;

X6 is an amino acid selected from I, T and V;

X7 is G;

X8 is R;

X9 is Y;

X10 is an amino acid selected from F, H, K, L, M, N, S, T, V, W and Y; and

X11 is an amino acid selected from A, E, G, I, K, L, M, N, Q, R, S and T; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 5.

In embodiments, X1 of HCDR2 is an amino acid selected from G and M. In embodiments, X2 of HCDR2 is G. In embodiments, X3 of HCDR2 is I. In embodiments, X4 of HCDR2 is D. In embodiments, X6 of HCDR2 is an amino acid selected from I, T, and V. In embodiments, X7 of HCDR2 is G. In embodiments, X9 of HCDR2 is Y. In embodiments, X10 of HCDR2 is an amino acid selected from F, H, K, M, N, S, T, W, and Y. In embodiments, X11 of HCDR2 is an amino acid selected from A, G, I, K, L, M, N, Q, R, S, and T. In embodiments, X11 of HCDR2 is K. In embodiments, X11 of HCDR2 is M. In embodiments, X11 of HCDR2 is R.

In aspects, disclosed herein is an antibody that binds to GPRC5D comprising a heavy chain variable region (HVR) and light chain variable region (LVR), wherein the antibody comprises:

a light chain variable region comprising SEQ ID NO: 1 (LCDR1), SEQ ID NO: 2 (LCDR2), and SEQ ID NO: 3 (LCDR3); and a heavy chain variable region comprising SEQ ID NO: 4 (HCDR1), SEQ ID NO: 5 (HCDR2), and an HCDR3, wherein the HCDR3 comprises an amino acid sequence of X1X2X3X4X5X6X7X8X9X10X11X12X13X1-4X15X16X17X18, wherein X1 is P;

X2 is an amino acid selected from A, F, H, I, K, L, M, N, Q, R, S and T;

X3 is C;

X4 is S;

X5 is an amino acid selected from G and T;

X6 is R;

X7 is an amino acid selected from D, E, G, W and Y;

X8 is an amino acid selected from D, L and T;

X9 is C;

X10 is W;

X11 is Y;

X12 is S;

X13 is A;

X14 is A;

X15 is G;

X16 is I;

X17 is an amino acid selected from A, D, E, G, H, I, L, M, Q, S and V; and

X18 is an amino acid selected from A, I, K, Q, S, T and V; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 6.

In this aspect, the antibody that binds to GPRC5D may have at least a 80% increase in binding reactivity compared to the binding reactivity of a wild-type GPRC5D antibody.

In embodiments, X1 of HCDR3 is P. In embodiments, X2 of HCDR3 is an amino acid selected from A, F, H, I, K, L, M, R, S, and T. In embodiments, X3 of HCDR3 is Y. In embodiments, X4 of HCDR3 is S. In embodiments, X5 of HCDR3 is T. In embodiments, X6 of HCDR3 is R. In embodiments, X7 of HCDR3 is an amino acid selected from D, G, W, and Y. In embodiments, X8 of HCDR3 is an amino acid selected from D, L, and T. In embodiments, X9 of HCDR3 is C. In embodiments, X10 of HCDR3 is W. In embodiments, X12 of HCDR3 is S. In embodiments, X13 of HCDR3 is A. In embodiments, X14 of HCDR3 is A. In embodiments, X15 of HCDR3 is G. In embodiments, X16 of HCDR3 is I. In embodiments, X17 of HCDR3 is an amino acid selected from A, D, E, H, I, L, M, Q, and V. In embodiments, X18 of HCDR3 is an amino acid selected from I, K, Q, S, T, and V. In embodiments, X2 of HCDR3 is 1. In embodiments, X2 of HCDR3 is M. In embodiments, X17 of HCDR3 is H. In embodiments, X17 of HCDR3 is I. In embodiments, X17 of HCDR3 is Q. In embodiments, X18 of HCDR3 is K. The antibody of any one of the preceding embodiments, wherein the antibody is a monoclonal antibody, or a binding fragment thereof.

In embodiments, disclosed herein is an antibody that binds to GPRC5D comprising: a heavy chain variable region comprising: a HCDR1 comprising the amino acid sequence of [S, H, K, W, or Y][Y, F, I, or L]GM[G, A, D, I, L, M, or S]; a HCDR2 comprising the amino acid sequence of [A, G, or M]GIDN[T, I, or V]GRY[T, F, H, K, M, N, S, W, or Y][G, A, G, I, K, L, M, N, Q, R, S, or T]YGSAVKG; a HCDR3 comprising the amino acid sequence of P[T, A, F, H, I, K, L, M, R, and S]C, S[G, T]R[D, G, W or Y][D, L or T]CWYSAAGI[D, A, E, H, I, L, M, Q or V][A, I, K, Q, S, T or V]; a light chain variable region comprising: a LCDR1 comprising the amino acid sequence of [S, K, or T]GG[S, H, I, K, L, N, Q, T, or V][Y or G]R[Y, K, T, V, or W]G a LCDR2 comprising the amino acid sequence of [G, I or S][T, N, or S][N, F, H R, S, W or Y]KRPS; and a LCDR3 comprising the amino acid sequence of G[S or G]R[D, N or T][S, G or H][S, H, K, R, or T]Y[F, A, E, G, H, I, K, N, Q, R, S, T or Y][S, A, G, P, or V][L, A, M, S or T].

In embodiments, disclosed herein is an antibody that binds to GPRC5D comprising a heavy chain variable region (HVR) and light chain variable region (LVR), wherein the antibody comprises: a light chain variable region comprising SEQ ID NO: 1 (LCDR1), SEQ ID NO: 2 (LCDR2), and SEQ ID NO: 3 (LCDR3); and a heavy chain variable region comprising SEQ ID NO: 4 (HCDR1), SEQ ID NO: 5 (HCDR2), and SEQ ID NO: 6 (HCDR3).

In embodiments, the antibody is a monoclonal antibody, or a binding fragment thereof.

In embodiments, the antibody is selected from a single-domain antibody, single-chain antibody (scFv), Fv, Fab, Fab', and F(ab')2.

In embodiments, the antibody is in the form of an antibody format selected from binding fragment-His (e.g., VHH-His or scFv-His), binding fragment-Fc (e.g., VHH-Fc or scFv-Fc), a biparatopic molecule (e.g., biparatopic VHH-Fc), tetravalent molecule (e.g., a tetravalent VHH-Fc), bidisulfide-bond stabilized scFv (ds-scFv), bi-specific antibody, Tri-TAC, single chain Fab (scFab), Fc-heterodimeric molecules, di- and multimeric antibody formats like dia-, tria- and tetra-bodies, Fab-IgG, IgG-Fab, and IgG-VHH.

In embodiments, the antibody further comprises variable region framework (FW) sequences juxtaposed between the CDRs according to the formula (FW1)-(CDR1)-(FW2)-(CDR2)-(FW3)-(CDR3)-(FW4).

In embodiments, the variable region FW sequences are human.

In embodiments, disclosed herein is a bispecific or a trispecific antibody comprising the antibody of any one of the preceding embodiments.

In embodiments, disclosed herein is a polynucleotide comprising a nucleic acid sequence encoding an antibody, a bispecific antibody, a trispecific antibody, or antibody format of any one of the preceding embodiments.

In embodiments, the polynucleotide is DNA or RNA.

In embodiments, the RNA is a modified mRNA.

In embodiments, disclosed herein is a vector comprising the polynucleotide of any one of the preceding embodiments.

In embodiments, disclosed herein is a host cell comprising the vector any one of the preceding embodiments, or the polynucleotide of any one of the preceding embodiments.

In embodiments, disclosed herein is a pharmaceutical composition comprising the antibody, bispecific antibody, trispecific antibody, or antibody format of any one of the preceding embodiments, or the polynucleotide of any one of the preceding embodiments, and a pharmaceutically acceptable excipient.

In embodiments, disclosed herein is a method of treating a disease in a subject, the method comprising administering to the subject the antibody, bispecific antibody, trispecific antibody, or antibody format of any one of the preceding embodiments, or the polynucleotide of any one of the preceding embodiments, or the pharmaceutical composition of any one of the preceding embodiments.

In embodiments, the disease is an autoimmune disease.

In embodiments, the autoimmune diseases is one or more of rheumatoid arthritis, systemic lupus erythematosus, diabetes mellitus, ankylosing spondylitis, Sjögren's syndrome, inflammatory bowel diseases (e.g., colitis ulcerosa, Crohn's disease), multiple sclerosis, sarcoidosis, psoriasis, Grave's disease, Hashimoto's thyroiditis, psoriasis, hypersensitivity reactions (e.g., allergies, hay fever, asthma, and acute edema cause type I hypersensitivity reactions), pemphigus, and vasculitis (e.g. Granulomatosis with polyangiitis).

In embodiments, disclosed herein is a method of treating cancer in a subject, the method comprising administering to the subject the antibody, bispecific antibody, trispecific antibody, or antibody format of any one of the preceding embodiments, or the polynucleotide of any one of the preceding embodiments, or the pharmaceutical composition of any one of the preceding embodiments.

In embodiments, the cancer is selected from breast cancer (e.g., breast ductal carcinoma, breast lobular carcinoma, triple-negative breast cancer (TNBC)), bone cancer, abdominal cancer, adrenal cancer, adrenocortical carcinoma, bladder cancer (e.g., bladder urothelial carcinoma), a blood cancer (e.g., leukemia, and acute myeloid leukemia), brain cancer (e.g., glioblastoma multiforme), cervical cancer (e.g., cervical carcinoma), colon cancer (e.g. colorectal adenocarcinoma), endometrial cancer, esophageal cancer (e.g., esophageal carcinoma), eye cancer (e.g., uveal melanoma), head and neck cancer (e.g., head and neck squamous cell carcinoma), intestinal cancer, kidney cancer (e.g., chromophobe renal cell carcinoma, clear cell renal cell carcinoma, papillary renal cell carcinoma), liver cancer (e.g., hepatocellular carcinoma), lung cancer (e.g., lung adenocarcinoma, lung squamous cell carcinoma, and mesothelioma), ovarian cancer (e.g., ovarian serous adenocarcinoma, and ovarian serous cystadenocarcinoma), pancreatic cancer (e.g., pancreatic ductal adenocarcinoma), prostate cancer (e.g., prostate adenocarcinoma), a sarcoma cancer, a skin cancer (e.g., skin cutaneous melanoma), spleen cancer, stomach cancer (e.g., gastric adenocarcinoma), testicular cancer (e.g., testicular germ cell cancer), thyroid cancer, thyroid papillary carcinoma, uterine cancer (e.g., uterine carcinosarcoma, and uterine corpus endometrioid carcinoma), vaginal cancer, and vulval cancer.

In embodiments, the cancer is selected from acute lymphoblastic leukemia, chondrosarcoma, differentiated thyroid carcinoma, endocervical adenocarcinoma, ewing sarcoma, follicular lymphoma, hodgkin lymphoma, multiple myeloma, neuroblastoma, non-small cell lung cancer, small cell lung cancer, basal cell carcinoma, merkel cell carcinoma, rhabdomyosarcoma, thyroid follicular carcinoma, thyroid medullary carcinoma, and urothelial carcinoma of the bladder.

In embodiments, disclosed herein is an antibody that binds to GPRC5D comprising: a heavy chain variable region comprising a HCDR1 comprising the amino acid sequence of SYGMG (SEQ ID NO: 4) or a variant thereof; a HCDR2 comprising the amino acid sequence of AGIDNT-GRYTGYGSAVKG (SEQ ID NO: 5) or a variant thereof; a HCDR3 comprising the amino acid sequence of PTCS-GRDDCWYSAAGIDA (SEQ ID NO: 6) or a variant thereof; and a light chain variable region comprising a LCDR1 comprising the amino acid sequence of SGGSYRYG (SEQ ID NO: 1) or a variant thereof; a LCDR2 comprising the amino acid sequence of GTNKRPS (SEQ ID NO: 2) or a variant thereof; and a LCDR3 comprising the amino acid sequence of GSRDSSYFSL (SEQ ID NO: 3) or a variant thereof, wherein: the variant of HCDR1 is a substitution to an amino acid selected from: A, F, H, K, R, W, and Y at the first position, F, I, and L at the second position, and/or A, D, E, I, L, M, S, and T at the fifth position; the variant of HCDR2 is a substitution to an amino acid selected from: G and M at the first position, I and V at the sixth position, F, H, K, L, M, N, S, V, W, and Y at the tenth position, and/or A, E, I, K, L, M, N, Q, R, S, and T at the eleventh position; the variant of HCDR3 is a substitution to an amino acid selected from: A, F, H, I, K, L, M, N, Q, R, and T at the second position; T at the fifth position; E, G, W and Y at the seventh position; L and T at the eighth position; A, E, G, H, I, L, M, Q, S and V; at the seventeenth position; and/or I, K, Q, S, T and V at the eighteenth position; the variant of LCDR1 is a substitution to an amino acid selected from: H, I, K, M, Q, T and V at the first position; F, G, H, I, K, L, M, N, Q, R, T, V and W at the fourth position; G at the fifth position; K at the sixth position, and/or F, K, T, V, and W at the seventh position; the variant of LCDR2 is a substitution to an amino acid selected from: I and S at the first position; G, N, and S at the second position; F, H, K, R, S, T, W and Y at the third position; and/or R at the fourth position; and the variant of LCDR3 is a substitution to an amino acid selected from: G at the second position; L, S and Y at the third position; N and T at the fourth position; D, F, G, H, K, and L at the fifth position; G, H, K, L, N, R and T at the sixth position; A, D, E, G, H, I, K, N, Q, R, S, T and Y at the eighth position; A, G, I, P and V at the ninth position; and/or A, M, S and T at the tenth position.

In embodiments, the antibody or antibody format, or fragment thereof, further comprises variable region framework (FW) sequences juxtaposed between the CDRs according to the formula (FW1)-(CDR1)-(FW2)-(CDR2)-(FW3)-(CDR3)-(FW4), wherein the variable region FW sequences in the heavy chain variable region are heavy chain variable region FW sequences, and wherein the variable region FW sequences in the light chain variable region are light chain variable region FW sequences.

In embodiments, the variable region FW sequences are human.

In embodiments, the antibody comprises human heavy chain and light chain constant regions.

In embodiments, the constant regions are selected from IgG1, IgG2, IgG3, and IgG4.

In embodiments, the antibody comprises: (i) a heavy chain variable region sequence comprising the amino acid sequence set forth in SEQ ID NO: 7, or the amino acid sequence of SEQ ID NO: 7 having at least 90% identity thereto; and (ii) a light chain variable region sequence comprising the amino acid sequence of SEQ ID NO: 8, or the amino acid sequence of SEQ ID NO: 8 having at least 90% identity thereto.

In embodiments, the antibody comprises an amino acid sequence having at least 95% with SEQ ID NO: 7 and/or SEQ ID NO. 8.

In embodiments, the antibody comprises an amino acid sequence having at least 98% with SEQ ID NO: 7 and/or SEQ ID NO. 8.

In embodiments, the antibody is a monoclonal antibody.

In embodiments, the antibody is selected from a single-chain antibody (scFv), Fv, Fab, Fab', and F(ab')2.

In embodiments, disclosed herein is a polynucleotide comprising a nucleic acid sequence encoding the antibody of any one of the embodiments herein.

In embodiments, disclosed herein is a vector comprising the polynucleotide of any one of the embodiments herein.

In embodiments, disclosed herein is a host cell comprising the vector of any one of the embodiments herein.

In embodiments, disclosed herein is a pharmaceutical composition comprising the antibody of any one of the embodiments herein, and a pharmaceutically acceptable excipient.

In embodiments, disclosed herein is a method of treating a disease in a subject, the method comprising administering to the subject the antibody the pharmaceutical composition of any one of the embodiments herein.

In embodiments, disclosed herein is a method of treating cancer in a subject, the method comprising administering to the subject the pharmaceutical composition of any one of the embodiments herein.

The details of one or more examples of the disclosure are set forth in the description below. Other features or advantages of the present disclosure will be apparent from the following drawings, detailed description of several examples, and also from the appended claims. The details of the disclosure are set forth in the accompanying description below. Although methods and materials similar or equivalent to those described herein can be used in the practice or testing of the present disclosure, illustrative methods and materials are now described. Other features, objects, and advantages of the disclosure will be apparent from the description and from the claims. In the specification and the appended claims, the singular forms also include the plural unless the context clearly dictates otherwise. Unless defined otherwise, all technical and scientific terms used herein have the same meaning as commonly understood by one of ordinary skill in the art to which this disclosure belongs.

DESCRIPTION OF THE DRAWINGS

FIG. 1A and FIG. 1B are graphs showing binding and expression of alanine mutations across the CDRs. FIG. 1A and FIG. 1B show how alanine substitutions eliminate the side-chain of each individual amino acid, and show residues involved in the wild type antibody for binding (the 'paratope', plus other CDR residues). Wild-type alanine CDR sites were mutated to serine. After mutations across the antibody CDRs were cloned and expressed, binding (gray bars) and expression levels (blue diamonds) of each alanine or serine mutation were measured by ELISA. Each binding and expression value is the average of two replicates.

FIG. 2A and FIG. 2B are graphs showing the identification of residues that define the paratope. Alanine substitutions eliminate the side-chain of each individual amino acid, so define which residues are involved in the wild type antibody for binding (the 'paratope', plus other CDR residues involved in binding). Binding levels of each variant were measured in duplicate and normalized to expression levels using a dilution curve of wild type (WT) antibody. Binding was then normalized to % WT antibody reactivity (defined as 100%).

DETAILED DESCRIPTION

GPRC5D is a receptor that has gained attention in the context of multiple myeloma (MM) due to its unique expression profile. This receptor is primarily expressed on malignant plasma cells, making it a promising target for immunotherapy aimed at treating MM. Unlike other targets in oncology, GPRC5D exhibits limited expression in normal tissue, predominantly found in hair follicles, which reduces the risk of off-target effects when developing therapies that specifically target this receptor.

The function of GPRC5D is incompletely understood; however, its implication in MM suggests important roles in oncogenic processes. Genetic alterations in GPRC5D have been observed in a subset of myeloma patients and are thought to provide proliferative advantages, especially in the context of therapy resistance. The receptor's transformations may result in monoallelic or biallelic variants, which can influence treatment outcomes and the efficacy of GPRC5D-targeted therapies, like bispecific T-cell engagers that aim to redirect the immune response to facilitate the destruction of malignant cells.

One significant challenge in generating effective GPRC5D antibodies is the specific requirements for binding affinity and specificity. Specifically, the potential for cross-reactivity with other G-protein-coupled receptors (GPCRs) can lead to unintended consequences, such as off-target effects that may result in adverse reactions. Consequently, the design of GPRC5D-binding drugs necessitates advanced engineering approaches to enhance their therapeutic efficacy while aiming to limit any GPRC5D antibody side effects.

Also, the tumor microenvironment presents obstacles in the development of effective antibodies against GPRC5D. Factors such as antigen density on tumor cells can significantly influence the efficacy of T-cell redirection and antibody-drug conjugates. Higher antigen density compared to CAR T-cells is at times necessary to elicit a robust therapeutic effect. The selective nature of GPRC5D expression, along with the presence of competing molecules in the tumor microenvironment, further complicates the therapeutic design.

To address these challenges, disclosed herein is the development of compositions and methods that generate a novel GPRC5D antibody. The compositions and methods disclosed herein are based, in part, on systematic scanning of complementarity-determining regions for potential amino acid substitutions in a GPRC5D antibody. As described herein, high-throughput technologies are utilized to streamline the GPRC5D antibody engineering process, thereby improving both the expression and binding affinity of the GPRC5D antibodies produced. Overall, the compositions and methods disclosed herein improve the efficiency of GPRC5D antibody discovery, and allow the development of therapeutics that can effectively target diseases while minimizing potential adverse effects.

CDR Scanning and Paratope Mapping

Disclosed herein are compositions and methods that, without wishing to be bound by theory, encompass all possible individual natural amino acid substitutions at each residue within the CDRs of GPRC5D. By systematically assessing these variants, the compositions and methods disclosed herein intricately define the "paratope" comprising the specific residues of the GPRC5D antibody that directly interact with the target antigen. Furthermore, the compositions and methods disclosed herein provide for a wide range of alternate amino acid substitutions throughout the CDRs that facilitate effective binding, thereby ensuring a robust understanding of the structure-function relationship inherent in antibody interactions.

In addition to identifying the paratope, the compositions and methods disclosed herein provide GPRC5D antibody variants that demonstrate enhanced binding affinity or improved expression profiles compared to a parental antibody by leveraging advanced high-throughput mutagenesis techniques alongside sophisticated binding assays, the compositions and methods disclosed herein generate detailed insight into the performance of each variant. For example, the compositions and methods disclosed herein are capable of creating GPRC5D antibodies with properties tailored to specific applications, including increased expression, enhanced developability in manufacturing, increased stability under physiological conditions, reduced immunogenicity, pH-sensitivity, or modified specificity to target different disease markers.

As disclosed herein, a high-throughput mutagenesis binding assay was performed to facilitate the rapid screening of numerous antibody variants. This assay quantified both the expression levels and binding affinities of the generated constructs, providing data on how specific amino acid substitutions affect the antibody's performance. ELISA was used to measure binding in a streamlined manner. In this manner, the present disclosure provides, inter alia, extensive substitutions information to define several variants.

In aspects, disclosed herein is an antibody that binds to GPRC5D comprising a heavy chain variable region (HVR) and light chain variable region (LVR), wherein:

(a) the HVR comprises HCDR1, HCDR2, and HCDR3, wherein:

(1) the HCDR1 comprises an amino acid sequence of X1X2X3X4X5, wherein:

X1 is an amino acid selected from A, D, E, F, G, H, I, K, L, M, Q, R, S, T, V, W and Y;

X2 is an amino acid selected from F, G, I, K, L, M, N, Q, T, V and Y;

X3 is G;

Figure 1A:
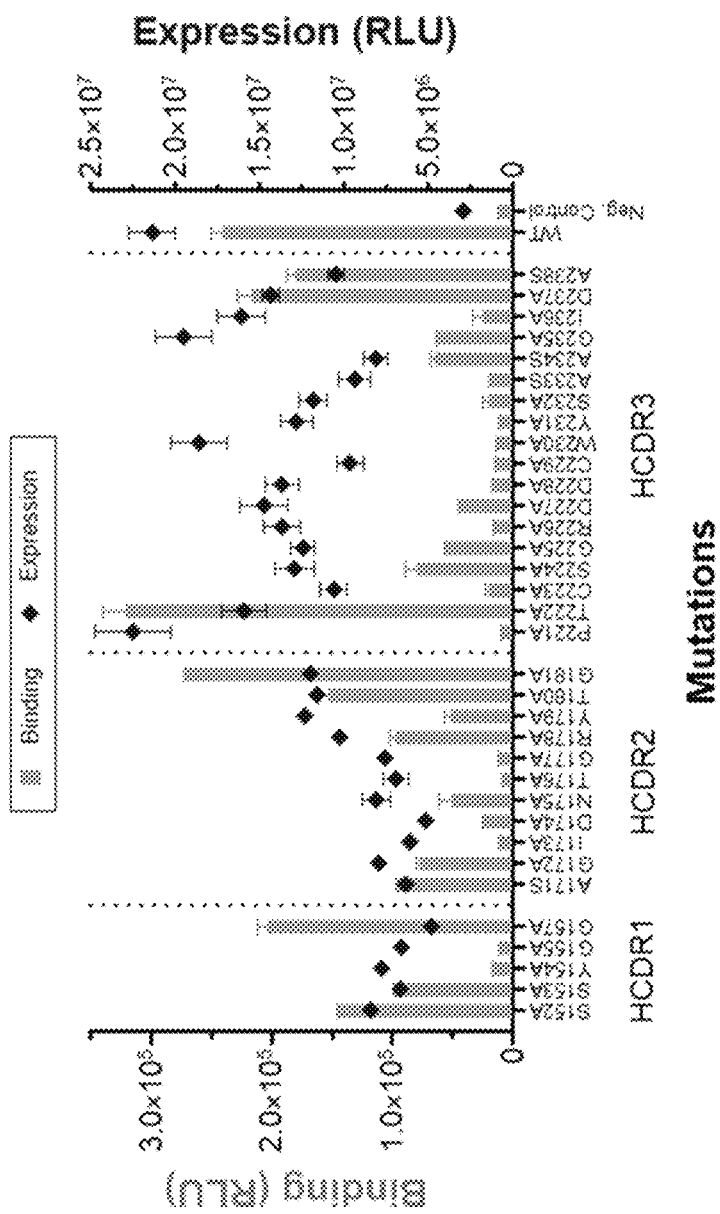

X4 is M;
X5 is an amino acid selected from A, C, D, E, G, H, I, K, L, M, P, Q, S, T and V; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 4;

(2) the HCDR2 comprises an amino acid sequence of X1X2X3X4X5X6X7X8X9X10X11YGSAVKG, wherein:
X1 is an amino acid selected from A, G, I, L, M, N, Q, S, T and V;
X2 is G;
X3 is an amino acid selected from A, C, E, G, I, M, Q, S, T and V;
X4 is an amino acid selected from A, C, D and N;
X5 is N;
X6 is an amino acid selected from C, I, T, V and W;
X7 is an amino acid selected from A, G, S and T;
X8 is an amino acid selected from A, G, H, I, K, L, M, N, R and S;
X9 is an amino acid selected from F, H and Y;
X10 is an amino acid selected from A, C, D, E, F, G, H, I, K, L, M, N, Q, R, S, T, V, W and Y;
X11 is an amino acid selected from A, C, D, E, F, G, H, I, K, L, M, N, Q, R, S, T, V and Y; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 5;

(3) the HCDR3 comprises an amino acid sequence of X1X2X3X4X5X6X7X8X9X10X11X12X13X14X15X16X17X18, wherein:
X1 is P;
X2 is an amino acid selected from A, C, F, H, I, K, L, M, N, Q, R, S, T and W;
X3 is C;
X4 is an amino acid selected from A, E, F, G, H, I, L, M, N, Q, R, S, T, V, W and Y;
X5 is an amino acid selected from A, G, M, N, Q, R, S and T;
X6 is an amino acid selected from I and R;
X7 is an amino acid selected from A, C, D, E, F, G, H, S, W and Y;
X8 is an amino acid selected from D, E, I, L, M, Q, R, S, T and V;
X9 is C;
X10 is W;
X11 is Y;
X12 is an amino acid selected from Q, R and S;
X13 is A;
X14 is an amino acid selected from A, G and S;
X15 is an amino acid selected from A, G and S;
X16 is an amino acid selected from F, I, Q, V and Y;
X17 is an amino acid selected from A, C, D, E, F, G, H, I, L, M, P, Q, R, S, T, V, W and Y;
X18 is an amino acid selected from A, E, F, G, I, K, L, M, N, Q, R, S, T, V and Y; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 6;

(b) the LVR comprises LCDR1, LCDR2, LCDR3, wherein:
(1) the LCDR1 comprises an amino acid sequence of X1X2X3X4X5X6X7X8, wherein:
X1 is an amino acid selected from A, D, E, F, G, H, I, K, L, M, N, Q, R, S, T, V, W and Y;
X2 is G;
X3 is an amino acid selected from G, P, R, S, T and V;
X4 is an amino acid selected from A, D, E, F, G, H, I, K, L, M, N, P, Q, R, S, T, V, W and Y;
X5 is an amino acid selected from A, D, F, G, H, I, K, L, M, Q, R, S, T, V, W and Y;
X6 is an amino acid selected from A, G, H, I, K, L, M, N, Q, R, S, T and V;
X7 is an amino acid selected from D, F, H, I, K, M, P, Q, R, T, V, W and Y;
X8 is an amino acid selected from G, R and S; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 1;

(2) the LCDR2 comprises an amino acid sequence of X1X2X3X4RPS, wherein:
X1 is an amino acid selected from G, I, K, N, P, R, S and V;
X2 is an amino acid selected from D, E, G, H, I, K, N, R, S, T, V and W;
X3 is an amino acid selected from C, D, F, G, H, I, K, M, N, Q, R, S, T, V, W and Y;
X4 is an amino acid selected from F, G, H, K, L, M, N, Q, R, S, V and Y; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 2;

(3) the LCDR3 comprises an amino acid sequence of X1X2X3X4X5X6X7X8X9X10, wherein:
X1 is an amino acid selected from F, G and Y;
X2 is an amino acid selected from A, E, G, H, I, K, L, Q, R, S and T;
X3 is an amino acid selected from A, G, H, I, L, Q, R, S, T, V, W and Y;
X4 is an amino acid selected from A, C, D, E, F, G, K, L, M, N, P, R, T, V, W and Y;
X5 is an amino acid selected from D, E, F, G, H, I, K, L, S, V, W and Y;
X6 is an amino acid selected from C, D, E, F, G, H, I, K, L, N, R, S, T, V and Y;
X7 is an amino acid selected from F, G, H, K, L, N, Q, R, S, T, W and Y;

X8 is an amino acid selected from A, C, D, E, F, G, H, I, K, N, Q, R, S, T, W and Y;

X9 is an amino acid selected from A, C, G, I, K, L, P, S, T and V;

X10 is an amino acid selected from A, C, F, G, H, I, K, L, M, N, Q, R, S, T, W and Y; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 3.

In this aspect, the antibody that binds to GPRC5D may have at least a 20% increase in binding reactivity compared to the binding reactivity of a wild-type GPRC5D antibody.

In embodiments, X1 of HCDR1 is an amino acid selected from H, K, S, W, and Y. In embodiments, X2 of HCDR1 is an amino acid selected from F, I, L, and Y. In embodiments, X3 of HCDR1 is G. In embodiments, X4 of HCDR1 is M. In embodiments, X5 of HCDR1 is an amino acid selected from A, D, G, I, L, M, and S.

In embodiments, X1 of HCDR2 is an amino acid selected from G and M. In embodiments, X2 of HCDR2 is G. In embodiments, X3 of HCDR2 is I. In embodiments, X4 of HCDR2 is D. In embodiments, X6 of HCDR2 is an amino acid selected from 1, T, and V. In embodiments, X7 of HCDR2 is G. In embodiments, X9 of HCDR2 is Y. In embodiments, X10 of HCDR2 is an amino acid selected from F, H, K, M, N, S, T, W, and Y. In embodiments, X11 of HCDR2 is an amino acid selected from A, G, I, K, L, M, N, Q, R, S, and T.

In embodiments, X1 of HCDR3 is P. In embodiments, X2 of HCDR3 is an amino acid selected from A, F, H, I, K, L, M, R, S, and T. In embodiments, X3 of HCDR3 is Y. In embodiments, X4 of HCDR3 is S. In embodiments, X5 of HCDR3 is T. In embodiments, X6 of HCDR3 is R. In embodiments, X7 of HCDR3 is an amino acid selected from D, G, W, and Y. In embodiments, X8 of HCDR3 is an amino acid selected from D, L, and T. In embodiments, X9 of HCDR3 is C. In embodiments, X10 of HCDR3 is W. In embodiments, X12 of HCDR3 is S. In embodiments, X13 of HCDR3 is A. In embodiments, X14 of HCDR3 is A. In embodiments, X15 of HCDR3 is G. In embodiments, X16 of HCDR3 is I. In embodiments, X17 of HCDR3 is an amino acid selected from A, D, E, H, I, L, M, Q, and V. In embodiments, X18 of HCDR3 is an amino acid selected from I, K, Q, S, T, and V.

In embodiments, X1 of LCDR1 is an amino acid selected from K, S, and T. In embodiments, X4 of LCDR1 is an amino acid selected from H, I, L, N, Q, T, and V. In embodiments, X5 of LCDR1 is G. In embodiments, X7 of LCDR1 is an amino acid selected from K, T, V, W, and Y. In embodiments, X8 of LCDR1 is G.

In embodiments, X1 of LCDR2 is an amino acid selected from G and S. In embodiments, X2 of LCDR2 is an amino acid selected from N, S, and T. In embodiments, X3 of LCDR2 is an amino acid selected from F, H, R, S, W, and Y. In embodiments, X4 of LCDR2 is K.

In embodiments, X1 of LCDR3 is G. In embodiments, X2 of LCDR3 is an amino acid selected from G and S. In embodiments, X3 of LCDR3 is R. In embodiments, X4 of LCDR3 is an amino acid selected from D, N and T. In embodiments, X5 of LCDR3 is an amino acid selected from G and H. In embodiments, X6 of LCDR3 is an amino acid selected from H, K, R, S, and T. In embodiments, X7 of LCDR3 is Y. In embodiments, X8 of LCDR3 is an amino acid selected from A, E, G, H, I, K, N, Q, R, S, T, and Y. In embodiments, X9 of LCDR3 is an amino acid selected from A, G, P, S, and V. In embodiments, X10 of LCDR3 is an amino acid selected from A, L, M, S, and T.

In aspects, disclosed herein is an antibody that binds to GPRC5D comprising a heavy chain variable region (HVR) and light chain variable region (LVR), wherein:

(a) the HVR comprises HCDR1, HCDR2, and HCDR3, wherein (1) the HCDR1 comprises an amino acid sequence of X1X2X3X4X5, wherein X1 is an amino acid selected from A, D, E, F, G, H, I, K, L, M, Q, R, S, T, V, W and Y;

X2 is an amino acid selected from F, G, I, K, L, M, N, Q, T, V and Y;

X3 is G;

X4 is M;

X5 is an amino acid selected from A, C, D, E, G, H, I, K, L, M, P, Q, S, T and V; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 4;

(2) the HCDR2 comprises an amino acid sequence of X1X2X3X4X5X6X7X8X9X10X11YGSAVKG, wherein X1 is an amino acid selected from A, G, L, M and S;

X2 is G;

X3 is an amino acid selected from I, M and V;

X4 is D;

X5 is N;

X6 is an amino acid selected from I, T and V;

X7 is an amino acid selected from G and S;

X8 is an amino acid selected from G, H and R;

X9 is Y;

X10 is an amino acid selected from A, D, F, H, I, K, L, M, N, Q, R, S, T, V, W and Y;

X11 is an amino acid selected from A, E, G, H, I, K, L, M, N, Q, R, S, T and V; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 5;

(3) the HCDR3 comprises an amino acid sequence of X1X2X3X4X5X6X7X8X9X10X11X12X13-X14X15X16X17X18, wherein X1 is P;

X2 is an amino acid selected from A, F, H, I, K, L, M, N, Q, R, S and T;

X3 is C;

X4 is an amino acid selected from A, E, H, L, M, R, S and T;

X5 is an amino acid selected from G, S and T;

X6 is R;

X7 is an amino acid selected from D, E, G, W and Y;

X8 is an amino acid selected from D, L, M, T and V;

X9 is C;

X10 is W;

X11 is Y;
X12 is S;
X13 is A;
X14 is an amino acid selected from A and S;
X15 is G;
X16 is I;
X17 is an amino acid selected from A, D, E, G, H, I, L, M, Q, R, S, T, V and Y;
X18 is an amino acid selected from A, E, G, I, K, L, M, N, Q, R, S, T and V; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 6;

(b) the LVR comprises LCDR1, LCDR2, LCDR3, wherein
(1) the LCDR1 comprises an amino acid sequence of X1X2X3X4X5X6X7X8, wherein
X1 is an amino acid selected from A, E, F, H, I, K, L, M, N, Q, R, S, T, V, W and Y;
X2 is G;
X3 is G;
X4 is an amino acid selected from A, F, G, H, I, K, L, M, N, P, Q, R, S, T, V, W and Y;
X5 is an amino acid selected from A, F, G, H, S, T, W and Y;
X6 is an amino acid selected from G, K, R and S;
X7 is an amino acid selected from F, K, T, V, W and Y;
X8 is G; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 1;

(2) the LCDR2 comprises an amino acid sequence of X1X2X3X4RPS, wherein
X1 is an amino acid selected from G, I, K, N, R and S;
X2 is an amino acid selected from G, N, S and T;
X3 is an amino acid selected from F, G, H, K, N, R, S, T, V, W and Y;
X4 is an amino acid selected from H, K and R; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 2;

(3) the LCDR3 comprises an amino acid sequence of X1X2X3X4X5X6X7X8X9X10, wherein
X1 is G;
X2 is an amino acid selected from G and S;
X3 is an amino acid selected from A, H, I, L, R, S, V, W and Y;
X4 is an amino acid selected from A, D, G, K, N and T;
X5 is an amino acid selected from D, E, F, G, H, I, K, L, S, V, W and Y;
X6 is an amino acid selected from D, E, F, G, H, K, L, N, R, S, T, V and Y;
X7 is an amino acid selected from F, S and Y;
X8 is an amino acid selected from A, C, D, E, F, G, H, I, K, N, Q, R, S, T, W and Y;
X9 is an amino acid selected from A, C, G, I, P, S and V;
X10 is an amino acid selected from A, I, L, M, N, Q, S and T; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 3.

In this aspect, the antibody that binds to GPRC5D may have at least a 50% increase in binding reactivity compared to the binding reactivity of a wild-type GPRC5D antibody.

In embodiments, X1 of HCDR1 is an amino acid selected from H, K, S, W, and Y. In embodiments, X2 of HCDR1 is an amino acid selected from F, I, L, and Y. In embodiments, X3 of HCDR1 is G. In embodiments, X4 of HCDR1 is M. In embodiments, X5 of HCDR1 is an amino acid selected from A, D, G, I, L, M, and S.

In embodiments, X1 of HCDR2 is an amino acid selected from G and M. In embodiments, X2 of HCDR2 is G. In embodiments, X3 of HCDR2 is I. In embodiments, X4 of HCDR2 is D. In embodiments, X6 of HCDR2 is an amino acid selected from 1, T, and V. In embodiments, X7 of HCDR2 is G. In embodiments, X9 of HCDR2 is Y. In embodiments, X10 of HCDR2 is an amino acid selected from F, H, K, M, N, S, T, W, and Y. In embodiments, X11 of HCDR2 is an amino acid selected from A, G, I, K, L, M, N, Q, R, S, and T.

In embodiments, X1 of HCDR3 is P. In embodiments, X2 of HCDR3 is an amino acid selected from A, F, H, I, K, L, M, R, S, and T. In embodiments, X3 of HCDR3 is Y. In embodiments, X4 of HCDR3 is S. In embodiments, X5 of HCDR3 is T. In embodiments, X6 of HCDR3 is R. In embodiments, X7 of HCDR3 is an amino acid selected from D, G, W, and Y. In embodiments, X8 of HCDR3 is an amino acid selected from D, L, and T. In embodiments, X9 of HCDR3 is C. In embodiments, X10 of HCDR3 is W. In embodiments, X12 of HCDR3 is S. In embodiments, X13 of HCDR3 is A. In embodiments, X14 of HCDR3 is A. In embodiments, X15 of HCDR3 is G. In embodiments, X16 of HCDR3 is I. In embodiments, X17 of HCDR3 is an amino acid selected from A, D, E, H, I, L, M, Q, and V. In embodiments, X18 of HCDR3 is an amino acid selected from I, K, Q, S, T, and V.

In embodiments, X1 of LCDR1 is an amino acid selected from K, S, and T. In embodiments, X4 of LCDR1 is an amino acid selected from H, I, L, N, Q, T, and V. In embodiments, X5 of LCDR1 is G. In embodiments, X7 of LCDR1 is an amino acid selected from K, T, V, W, and Y. In embodiments, X8 of LCDR1 is G.

In embodiments, X1 of LCDR2 is an amino acid selected from G and S. In embodiments, X2 of LCDR2 is an amino acid selected from N, S, and T. In embodiments, X3 of LCDR2 is an amino acid selected from F, H, R, S, W, and Y. In embodiments, X4 of LCDR2 is K.

In embodiments, X1 of LCDR3 is G. In embodiments, X2 of LCDR3 is an amino acid selected from G and S. In embodiments, X3 of LCDR3 is R. In embodiments, X4 of LCDR3 is an amino acid selected from D, N and T. In embodiments, X5 of LCDR3 is an amino acid selected from G and H. In embodiments, X6 of LCDR3 is an amino acid selected from H, K, R, S, and T. In embodiments, X7 of LCDR3 is Y. In embodiments, X8 of LCDR3 is an amino acid selected from A, E, G, H, I, K, N, Q, R, S, T, and Y. In embodiments, X9 of LCDR3 is an amino acid selected from A, G, P, S, and V. In embodiments, X10 of LCDR3 is an amino acid selected from A, L, M, S, and T.

In aspects, disclosed herein is an antibody that binds to GPRC5D comprising a heavy chain variable region (HVR) and light chain variable region (LVR), wherein
(a) the HVR comprises HCDR1, HCDR2, and HCDR3, wherein:
  (1) the HCDR1 comprises an amino acid sequence of X1X2X3X4X5, wherein
    X1 is an amino acid selected from A, D, E, F, G, H, I, K, L, M, Q, R, S, T, V, W and Y;
    X2 is an amino acid selected from F, G, I, K, L, M, N, Q, T, V and Y;
    X3 is G;
    X4 is M;
    X5 is an amino acid selected from A, C, D, E, G, H, I, K, L, M, P, Q, S, T and V; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 4;
  (2) the HCDR2 comprises an amino acid sequence of X1X2X3X4X5X6X7X8X9X10X11YGSAVKG, wherein:
    X1 is an amino acid selected from A, G and M;
    X2 is G;
    X3 is I;
    X4 is D;
    X5 is N;
    X6 is an amino acid selected from I, T and V;
    X7 is G;
    X8 is R;
    X9 is Y;
    X10 is an amino acid selected from F, H, K, L, M, N, S, T, V, W and Y;
    X11 is an amino acid selected from A, E, G, I, K, L, M, N, Q, R, S and T; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 5;
  (3) the HCDR3 comprises an amino acid sequence of X1X2X3X4X5X6X7X8X9X10X11X12X13X1-4X15X16X17X18, wherein:
    X1 is P;
    X2 is an amino acid selected from A, F, H, I, K, L, M, N, Q, R, S and T;
    X3 is C;
    X4 is S;
    X5 is an amino acid selected from G and T;
    X6 is R;
    X7 is an amino acid selected from D, E, G, W and Y;
    X8 is an amino acid selected from D, L and T;
    X9 is C;
    X10 is W;
    X11 is Y;
    X12 is S;
    X13 is A;
    X14 is A;
    X15 is G;
    X16 is I;
    X17 is an amino acid selected from A, D, E, G, H, I, L, M, Q, S and V;
    X18 is an amino acid selected from A, I, K, Q, S, T and V; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 6;
(b) the LVR comprises LCDR1, LCDR2, LCDR3, wherein:
  (1) the LCDR1 comprises an amino acid sequence of X1X2X3X4X5X6X7X8, wherein:
    X1 is an amino acid selected from H, I, K, M, Q, S, T and V;
    X2 is G;
    X3 is G;
    X4 is an amino acid selected from F, G, H, I, K, L, M, N, Q, R, S, T, V and W;
    X5 is an amino acid selected from G and Y;
    X6 is an amino acid selected from K and R;
    X7 is an amino acid selected from F, K, T, V, W and Y;
    X8 is G; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 1;
  (2) the LCDR2 comprises an amino acid sequence of X1X2X3X4RPS, wherein:
    X1 is an amino acid selected from G, I and S;
    X2 is an amino acid selected from G, N, S and T;
    X3 is an amino acid selected from F, H, K, N, R, S, T, W and Y;
    X4 is an amino acid selected from K and R; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 2;
  (3) the LCDR3 comprises an amino acid sequence of X1X2X3X4X5X6X7X8X9X10, wherein:
    X1 is G;
    X2 is an amino acid selected from G and S;
    X3 is an amino acid selected from L, R, S and Y;
    X4 is an amino acid selected from D, N and T;

X5 is an amino acid selected from D, F, G, H, K, L and S;

X6 is an amino acid selected from G, H, K, L, N, R, S and T;

X7 is Y;

X8 is an amino acid selected from A, D, E, F, G, H, I, K, N, Q, R, S, T and Y;

X9 is an amino acid selected from A, G, I, P, S and V;

X10 is an amino acid selected from A, L, M, S and T; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 3.

In this aspect, the antibody that binds to GPRC5D may have at least a 80% increase in binding reactivity compared to the binding reactivity of a wild-type GPRC5D antibody.

In embodiments, X1 of HCDR1 is an amino acid selected from H, K, S, W, and Y. In embodiments, X2 of HCDR1 is an amino acid selected from F, I, L, and Y. In embodiments, X3 of HCDR1 is G. In embodiments, X4 of HCDR1 is M. In embodiments, X5 of HCDR1 is an amino acid selected from A, D, G, I, L, M, and S.

In embodiments, X1 of HCDR2 is an amino acid selected from G and M. In embodiments, X2 of HCDR2 is G. In embodiments, X3 of HCDR2 is I. In embodiments, X4 of HCDR2 is D. In embodiments, X6 of HCDR2 is an amino acid selected from I, T, and V. In embodiments, X7 of HCDR2 is G. In embodiments, X9 of HCDR2 is Y. In embodiments, X10 of HCDR2 is an amino acid selected from F, H, K, M, N, S, T, W, and Y. In embodiments, X11 of HCDR2 is an amino acid selected from A, G, I, K, L, M, N, Q, R, S, and T.

In embodiments, X1 of HCDR3 is P. In embodiments, X2 of HCDR3 is an amino acid selected from A, F, H, I, K, L, M, R, S, and T. In embodiments, X3 of HCDR3 is Y. In embodiments, X4 of HCDR3 is S. In embodiments, X5 of HCDR3 is T. In embodiments, X6 of HCDR3 is R. In embodiments, X7 of HCDR3 is an amino acid selected from D, G, W, and Y. In embodiments, X8 of HCDR3 is an amino acid selected from D, L, and T. In embodiments, X9 of HCDR3 is C. In embodiments, X10 of HCDR3 is W. In embodiments, X12 of HCDR3 is S. In embodiments, X13 of HCDR3 is A. In embodiments, X14 of HCDR3 is A. In embodiments, X15 of HCDR3 is G. In embodiments, X16 of HCDR3 is I. In embodiments, X17 of HCDR3 is an amino acid selected from A, D, E, H, I, L, M, Q, and V. In embodiments, X18 of HCDR3 is an amino acid selected from I, K, Q, S, T, and V. In embodiments, X1 of LCDR1 is an amino acid selected from K, S, and T.

In embodiments, X4 of LCDR1 is an amino acid selected from H, I, L, N, Q, T, and V. In embodiments, X5 of LCDR1 is G. In embodiments, X7 of LCDR1 is an amino acid selected from K, T, V, W, and Y. In embodiments, X8 of LCDR1 is G.

In embodiments, X1 of LCDR2 is an amino acid selected from G and S. In embodiments, X2 of LCDR2 is an amino acid selected from N, S, and T. In embodiments, X3 of LCDR2 is an amino acid selected from F, H, R, S, W, and Y. In embodiments, X4 of LCDR2 is K.

In embodiments, X1 of LCDR3 is G. In embodiments, X2 of LCDR3 is an amino acid selected from G and S. In embodiments, X3 of LCDR3 is R. In embodiments, X4 of LCDR3 is an amino acid selected from D, N and T. In embodiments, X5 of LCDR3 is an amino acid selected from G and H. In embodiments, X6 of LCDR3 is an amino acid selected from H, K, R, S, and T. In embodiments, X7 of LCDR3 is Y. In embodiments, X8 of LCDR3 is an amino acid selected from A, E, G, H, I, K, N, Q, R, S, T, and Y. In embodiments, X9 of LCDR3 is an amino acid selected from A, G, P, S, and V. In embodiments, X10 of LCDR3 is an amino acid selected from A, L, M, S, and T.

In aspects, disclosed herein is an antibody that binds to GPRC5D comprising a heavy chain variable region (HVR) and light chain variable region (LVR), wherein the antibody comprises:

a light chain variable region comprising an LCDR1, SEQ ID NO: 2 (LCDR2), and SEQ ID NO: 3 (LCDR3); and a heavy chain variable region comprising SEQ ID NO: 4 (HCDR1), SEQ ID NO: 5 (HCDR2), and SEQ ID NO: 6 (HCDR3), wherein the LCDR1 comprises an amino acid sequence of X1X2X3X4X5X6X7X8, wherein:

X1 is an amino acid selected from H, I, K, M, Q, S, T and V;

X2 is G;

X3 is G;

X4 is an amino acid selected from F, G, H, I, K, L, M, N, Q, R, S, T, V and W;

X5 is an amino acid selected from G and Y;

X6 is an amino acid selected from K and R;

X7 is an amino acid selected from F, K, T, V, W and Y; and

X8 is G; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 1.

In this aspect, the antibody that binds to GPRC5D may have at least a 80% increase in binding reactivity compared to the binding reactivity of a wild-type GPRC5D antibody.

In embodiments, X1 of LCDR1 is an amino acid selected from K, S, and T. In embodiments, X4 of LCDR1 is an amino acid selected from H, I, L, N, Q, T, and V. In embodiments, X5 of LCDR1 is G. In embodiments, X7 of LCDR1 is an amino acid selected from K, T, V, W, and Y. In embodiments, X8 of LCDR1 is G.

In aspects, disclosed herein is an antibody that binds to GPRC5D comprising a heavy chain variable region (HVR) and light chain variable region (LVR), wherein the antibody comprises:

a light chain variable region comprising SEQ ID NO: 1 (LCDR1), an LCDR2, and SEQ ID NO: 3 (LCDR3); and a heavy chain variable region comprising SEQ ID NO: 4 (HCDR1), SEQ ID NO: 5 (HCDR2), and SEQ ID NO: 6 (HCDR3), wherein the LCDR2 comprises an amino acid sequence of X1X2X3X4RPS, wherein X1 is an amino acid selected from G, I and S;

X2 is an amino acid selected from G, N, S and T;

X3 is an amino acid selected from F, H, K, N, R, S, T, W and Y; and

X4 is an amino acid selected from K and R; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 2.

In this aspect, the antibody that binds to GPRC5D may have at least a 80% increase in binding reactivity compared to the binding reactivity of a wild-type GPRC5D antibody.

In embodiments, X1 of LCDR2 is an amino acid selected from G and S. In embodiments, X2 of LCDR2 is an amino acid selected from N, S, and T. In embodiments, X3 of LCDR2 is an amino acid selected from F, H, R, S, W, and Y. In embodiments, X4 of LCDR2 is K.

In aspects, disclosed herein is an antibody that binds to GPRC5D comprising a heavy chain variable region (HVR) and light chain variable region (LVR), wherein the antibody comprises:

a light chain variable region comprising SEQ ID NO: 1 (LCDR1), SEQ ID NO: 2 (LCDR2), and an LCDR3; and a heavy chain variable region comprising SEQ ID NO: 4 (HCDR1), SEQ ID NO: 5 (HCDR2), and SEQ ID NO: 6 (HCDR3), wherein the LCDR3 comprises an amino acid sequence of X1X2X3X4X5X6X7X8X9X10, X1 of LCDR3 is G;
X2 of LCDR3 is an amino acid selected from G and S;
X3 of LCDR3 is R;
X4 of LCDR3 is an amino acid selected from D, N and T;
X5 of LCDR3 is an amino acid selected from G and H;
X6 of LCDR3 is an amino acid selected from H, K, R, S, and T;
X7 of LCDR3 is Y;
X8 of LCDR3 is an amino acid selected from A, E, G, H, I, K, N, Q, R, S, T, and Y;
X9 of LCDR3 is an amino acid selected from A, G, P, S, and V; and
X10 of LCDR3 is an amino acid selected from A, L, M, S, and T; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 3.

In this aspect, the antibody that binds to GPRC5D may have at least a 80% increase in binding reactivity compared to the binding reactivity of a wild-type GPRC5D antibody.

In embodiments, X1 of LCDR3 is G. In embodiments, X2 of LCDR3 is an amino acid selected from G and S. In embodiments, X3 of LCDR3 is R. In embodiments, X4 of LCDR3 is an amino acid selected from D, N and T. In embodiments, X5 of LCDR3 is an amino acid selected from G and H. In embodiments, X6 of LCDR3 is an amino acid selected from H, K, R, S, and T. In embodiments, X7 of LCDR3 is Y. In embodiments, X8 of LCDR3 is an amino acid selected from A, E, G, H, I, K, N, Q, R, S, T, and Y. In embodiments, X9 of LCDR3 is an amino acid selected from A, G, P, S, and V. In embodiments, X10 of LCDR3 is an amino acid selected from A, L, M, S, and T. In embodiments, X9 of LCDR3 is G. In embodiments, X9 of LCDR3 is P.

In aspects, disclosed herein is an antibody that binds to GPRC5D comprising a heavy chain variable region (HVR) and light chain variable region (LVR), wherein the antibody comprises:

a light chain variable region comprising SEQ ID NO: 1 (LCDR1), SEQ ID NO: 2 (LCDR2), and SEQ ID NO: 3 (LCDR3); and a heavy chain variable region comprising an HCDR1, SEQ ID NO: 5 (HCDR2), and SEQ ID NO: 6 (HCDR3), wherein the HCDR1 comprises an amino acid sequence of X1X2X3X4X5, wherein
X1 is an amino acid selected from A, F, H, K, R, S, W and Y;
X2 is an amino acid selected from F, I, L and Y;
X3 is G;
X4 is M;
X5 is an amino acid selected from A, D, E, G, I, L, M, S and T.

In this aspect, the antibody that binds to GPRC5D may have at least a 80% increase in binding reactivity compared to the binding reactivity of a wild-type GPRC5D antibody.

In embodiments, X1 of HCDR1 is an amino acid selected from H, K, S, W, and Y. In embodiments, X2 of HCDR1 is an amino acid selected from F, I, L, and Y. In embodiments, X3 of HCDR1 is G. In embodiments, X4 of HCDR1 is M. In embodiments, X5 of HCDR1 is an amino acid selected from A, D, G, I, L, M, and S. In embodiments, X5 of HCDR1 is A. In embodiments, X5 of HCDR1 is I. In embodiments, X5 of HCDR1 is L.

In aspects, disclosed herein is an antibody that binds to GPRC5D comprising a heavy chain variable region (HVR) and light chain variable region (LVR), wherein the antibody comprises:

a light chain variable region comprising SEQ ID NO: 1 (LCDR1), SEQ ID NO: 2 (LCDR2), and SEQ ID NO: 3 (LCDR3); and a heavy chain variable region comprising SEQ ID NO: 4 (HCDR1), an HCDR2, and SEQ ID NO: 6 (HCDR3), wherein the HCDR2 comprises an amino acid sequence of X1X2X3X4X5X6X7X8X9X10X11YGSAVKG, wherein
X1 is an amino acid selected from A, G and M;
X2 is G;
X3 is I;
X4 is D;
X5 is N;
X6 is an amino acid selected from I, T and V;
X7 is G;
X8 is R;
X9 is Y;
X10 is an amino acid selected from F, H, K, L, M, N, S, T, V, W and Y; and
X11 is an amino acid selected from A, E, G, I, K, L, M, N, Q, R, S and T; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 5.

In this aspect, the antibody that binds to GPRC5D may have at least a 80% increase in binding reactivity compared to the binding reactivity of a wild-type GPRC5D antibody.

In embodiments, X1 of HCDR2 is an amino acid selected from G and M. In embodiments, X2 of HCDR2 is G. In embodiments, X3 of HCDR2 is I. In embodiments, X4 of HCDR2 is D. In embodiments, X6 of HCDR2 is an amino acid selected from I, T, and V. In embodiments, X7 of HCDR2 is G. In embodiments, X9 of HCDR2 is Y. In embodiments, X10 of HCDR2 is an amino acid selected from F, H, K, M, N, S, T, W, and Y. In embodiments, X11 of HCDR2 is an amino acid selected from A, G, I, K, L, M, N, Q, R, S, and T. In embodiments, X11 of HCDR2 is K. In embodiments, X11 of HCDR2 is M. In embodiments, X11 of HCDR2 is R.

In aspects, disclosed herein is an antibody that binds to GPRC5D comprising a heavy chain variable region (HVR) and light chain variable region (LVR), wherein the antibody comprises:

a light chain variable region comprising SEQ ID NO: 1 (LCDR1), SEQ ID NO: 2 (LCDR2), and SEQ ID NO: 3 (LCDR3); and a heavy chain variable region comprising SEQ ID NO: 4 (HCDR1), SEQ ID NO: 5 (HCDR2), and an HCDR3, wherein the HCDR3 comprises an amino acid sequence of X1X2X3X4X5X6X7X8X9X10X11X12X13X-14X15X16X17X18, wherein X1 is P;
X2 is an amino acid selected from A, F, H, I, K, L, M, N, Q, R, S and T;
X3 is C;
X4 is S;
X5 is an amino acid selected from G and T;
X6 is R;
X7 is an amino acid selected from D, E, G, W and Y;
X8 is an amino acid selected from D, L and T;
X9 is C;
X10 is W;
X11 is Y;
X12 is S;
X13 is A;
X14 is A;
X15 is G;
X16 is I;
X17 is an amino acid selected from A, D, E, G, H, I, L, M, Q, S and V; and
X18 is an amino acid selected from A, I, K, Q, S, T and V; or a variant thereof having at least about 60%, or at least about 65%, or at least about 70%, or at least about 75%, or at least about 80%, or at least about 85%, or at least about 90%, or at least about 91%, or at least about 92%, or at least about 93%, or at least about 94%, or at least about 95%, or at least about 96%, or at least about 97%, or at least about 98%, or at least about 99% identity to SEQ ID NO: 6.

In this aspect, the antibody that binds to GPRC5D may have at least a 80% increase in binding reactivity compared to the binding reactivity of a wild-type GPRC5D antibody.

In embodiments, X1 of HCDR3 is P. In embodiments, X2 of HCDR3 is an amino acid selected from A, F, H, I, K, L, M, R, S, and T. In embodiments, X3 of HCDR3 is Y. In embodiments, X4 of HCDR3 is S. In embodiments, X5 of HCDR3 is T. In embodiments, X6 of HCDR3 is R. In embodiments, X7 of HCDR3 is an amino acid selected from D, G, W, and Y. In embodiments, X8 of HCDR3 is an amino acid selected from D, L, and T. In embodiments, X9 of HCDR3 is C. In embodiments, X10 of HCDR3 is W. In embodiments, X12 of HCDR3 is S. In embodiments, X13 of HCDR3 is A. In embodiments, X14 of HCDR3 is A. In embodiments, X15 of HCDR3 is G. In embodiments, X16 of HCDR3 is I. In embodiments, X17 of HCDR3 is an amino acid selected from A, D, E, H, I, L, M, Q, and V. In embodiments, X18 of HCDR3 is an amino acid selected from I, K, Q, S, T, and V. In embodiments, X2 of HCDR3 is I. In embodiments, X2 of HCDR3 is M. In embodiments, X17 of HCDR3 is H. In embodiments, X17 of HCDR3 is I. In embodiments, X17 of HCDR3 is Q. In embodiments, X18 of HCDR3 is K. The antibody of any one of the preceding embodiments, wherein the antibody is a monoclonal antibody, or a binding fragment thereof.

In embodiments, disclosed herein is an antibody that binds to GPRC5D comprising: a heavy chain variable region comprising: a HCDR1 comprising the amino acid sequence of [S, H, K, W, or Y][Y, F, I, or L]GM[G, A, D, I, L, M, or S]; a HCDR2 comprising the amino acid sequence of [A, G, or M]GIDN[T, I, or V]GRY[T, F, H, K, M, N, S, W, or Y][G, A, G, I, K, L, M, N, Q, R, S, or T]YGSAVKG; a HCDR3 comprising the amino acid sequence of P [T, A, F, H, I, K, L, M, R, and S]C, S[G, T]R[D, G, W or Y][D, L or T]CWYSAAGI[D, A, E, H, I, L, M, Q or V][A, I, K, Q, S, T or V]; a light chain variable region comprising: a LCDR1 comprising the amino acid sequence of [S, K, or T]GG[S, H, I, K, L, N, Q, T, or V][Y or G]R[Y, K, T, V, or W]G a LCDR2 comprising the amino acid sequence of [G, I or S][T, N, or S][N, F, H R, S, W or Y]KRPS; and a LCDR3 comprising the amino acid sequence of G[S or G]R[D, N or T][S, G or H][S, H, K, R, or T]Y[F, A, E, G, H, I, K, N, Q, R, S, T or Y][S, A, G, P, or V][L, A, M, S or T].

In embodiments, disclosed herein is an antibody that binds to GPRC5D comprising a heavy chain variable region (HVR) and light chain variable region (LVR), wherein the antibody comprises: a light chain variable region comprising SEQ ID NO: 1 (LCDR1), SEQ ID NO: 2 (LCDR2), and SEQ ID NO: 3 (LCDR3); and a heavy chain variable region comprising SEQ ID NO: 4 (HCDR1), SEQ ID NO: 5 (HCDR2), and SEQ ID NO: 6 (HCDR3).

In embodiments, the antibody is a monoclonal antibody, or a binding fragment thereof.

In embodiments, the antibody is selected from a single-domain antibody, single-chain antibody (scFv), Fv, Fab, Fab', and F(ab')2.

In embodiments, the antibody is in the form of an antibody format selected from binding fragment-His (e.g., VHH-His or scFv-His), binding fragment-Fc (e.g., VHH-Fc or scFv-Fc), a biparatopic molecule (e.g., biparatopic VHH-Fc), tetravalent molecule (e.g., a tetravalent VHH-Fc), bidisulfide-bond stabilized scFv (ds-scFv), bi-specific antibody, Tri-TAC, single chain Fab (scFab), Fc-heterodimeric molecules, di- and multimeric antibody formats like dia-, tria- and tetra-bodies, Fab-IgG, IgG-Fab, and IgG-VHH.

In embodiments, the antibody further comprises variable region framework (FW) sequences juxtaposed between the CDRs according to the formula (FW1)-(CDR1)-(FW2)-(CDR2)-(FW3)-(CDR3)-(FW4).

In embodiments, the variable region FW sequences are human.

In embodiments, disclosed herein is a bispecific antibody or a trispecific antibody comprising the antibody of any one of the preceding embodiments.

In embodiments, disclosed herein is a polynucleotide comprising a nucleic acid sequence encoding an antibody, bispecific antibody, trispecific antibody, or antibody format of any one of the preceding embodiments.

In embodiments, the polynucleotide is DNA or RNA.

In embodiments, the RNA is a modified mRNA.

In embodiments, disclosed herein is a vector comprising the polynucleotide of any one of the preceding embodiments.

In embodiments, disclosed herein is a host cell comprising the vector any one of the preceding embodiments, or the polynucleotide of any one of the preceding embodiments.

In embodiments, disclosed herein is a pharmaceutical composition comprising the antibody, bispecific antibody, trispecific antibody, or antibody format of any one of the preceding embodiments, or the polynucleotide of any one of the preceding embodiments, and a pharmaceutically acceptable excipient.

In embodiments, disclosed herein is a method of treating a disease in a subject, the method comprising administering to the subject the antibody, bispecific antibody, trispecific antibody, or antibody format of any one of the preceding embodiments, or the polynucleotide of any one of the preceding embodiments, or the pharmaceutical composition of any one of the preceding embodiments.

In embodiments, the disease is an autoimmune disease.

In embodiments, the autoimmune diseases is one or more of rheumatoid arthritis, systemic lupus erythematosus, diabetes mellitus, ankylosing spondylitis, Sjögren's syndrome, inflammatory bowel diseases (e.g., colitis ulcerosa, Crohn's disease), multiple sclerosis, sarcoidosis, psoriasis, Grave's disease, Hashimoto's thyroiditis, psoriasis, hypersensitivity reactions (e.g., allergies, hay fever, asthma, and acute edema cause type I hypersensitivity reactions), pemphigus, and vasculitis (e.g. Granulomatosis with polyangiitis).

In embodiments, disclosed herein is a method of treating cancer in a subject, the method comprising administering to the subject the antibody, bispecific antibody, trispecific antibody, or antibody format of any one of the preceding embodiments, or the polynucleotide of any one of the preceding embodiments, or the pharmaceutical composition of any one of the preceding embodiments.

In embodiments, the cancer is selected from breast cancer (e.g., breast ductal carcinoma, breast lobular carcinoma, triple-negative breast cancer (TNBC)), bone cancer, abdominal cancer, adrenal cancer, adrenocortical carcinoma, bladder cancer (e.g., bladder urothelial carcinoma), a blood cancer (e.g., leukemia, and acute myeloid leukemia), brain cancer (e.g., glioblastoma multiforme), cervical cancer (e.g., cervical carcinoma), colon cancer (e.g. colorectal adenocarcinoma), endometrial cancer, esophageal cancer (e.g., esophageal carcinoma), eye cancer (e.g., uveal melanoma), head and neck cancer (e.g., head and neck squamous cell carcinoma), intestinal cancer, kidney cancer (e.g., chromophobe renal cell carcinoma, clear cell renal cell carcinoma, papillary renal cell carcinoma), liver cancer (e.g., hepatocellular carcinoma), lung cancer (e.g., lung adenocarcinoma, lung squamous cell carcinoma, and mesothelioma), ovarian cancer (e.g., ovarian serous adenocarcinoma, and ovarian serous cystadenocarcinoma), pancreatic cancer (e.g., pancreatic ductal adenocarcinoma), prostate cancer (e.g., prostate adenocarcinoma), a sarcoma cancer, a skin cancer (e.g., skin cutaneous melanoma), spleen cancer, stomach cancer (e.g., gastric adenocarcinoma), testicular cancer (e.g., testicular germ cell cancer), thyroid cancer, thyroid papillary carcinoma, uterine cancer (e.g., uterine carcinosarcoma, and uterine corpus endometrioid carcinoma), vaginal cancer, and vulval cancer.

In embodiments, the cancer is selected from acute lymphoblastic leukemia, chondrosarcoma, differentiated thyroid carcinoma, endocervical adenocarcinoma, ewing sarcoma, follicular lymphoma, hodgkin lymphoma, multiple myeloma, neuroblastoma, non-small cell lung cancer, small cell lung cancer, basal cell carcinoma, merkel cell carcinoma, rhabdomyosarcoma, thyroid follicular carcinoma, thyroid medullary carcinoma, and urothelial carcinoma of the bladder.

In embodiments, disclosed herein is an antibody that binds to GPRC5D comprising: a heavy chain variable region comprising: a HCDR1 comprising the amino acid sequence of [S, H, K, W, or Y][Y, F, I, or L]GM[G, A, D, I, L, M, or S]; a HCDR2 comprising the amino acid sequence of [A, G, or M]GIDN[T, I, or V]GRY[T, F, H, K, M, N, S, W, or Y][G, A, G, I, K, L, M, N, Q, R, S, or T]YGSAVKG; a HCDR3 comprising the amino acid sequence of P. [T, A, F, H, I, K, L, M, R, and S]C, S[G, T]R[D, G, W or Y][D, L or T]CWYSAAGI[D, A, E, H, I, L, M, Q or V][A, I, K, Q, S, T or V]; a light chain variable region comprising: a LCDR1 comprising the amino acid sequence of [S, K, or T]GG[S, H, I, K, L, N, Q, T, or V][Y or G]R[Y, K, T, V, or W]G a LCDR2 comprising the amino acid sequence of [G, I or S][T, N, or S][N, F, H R, S, W or Y]KRPS; and a LCDR3 comprising the amino acid sequence of G[S or G]R[D, N or T][S, G or H][S, H, K, R, or T]Y[F, A, E, G, H, I, K, N, Q, R, S, T or Y][S, A, G, P, or V][L, A, M, S or T].

In embodiments, disclosed herein is an antibody that binds to GPRC5D comprising: a heavy chain variable region comprising a HCDR1 comprising the amino acid sequence of SYGMG (SEQ ID NO: 4) or a variant thereof; a HCDR2 comprising the amino acid sequence of AGIDNT-GRYTGYGSAVKG (SEQ ID NO: 5) or a variant thereof; a HCDR3 comprising the amino acid sequence of PTCS-GRDDCWYSAAGIDA (SEQ ID NO: 6) or a variant thereof; and a light chain variable region comprising a LCDR1 comprising the amino acid sequence of SGGSYRYG (SEQ ID NO: 1) or a variant thereof; a LCDR2 comprising the amino acid sequence of GTNKRPS (SEQ ID NO: 2) or a variant thereof; and a LCDR3 comprising the amino acid sequence of GSRDSSYFSL (SEQ ID NO: 3) or a variant thereof, wherein: the variant of HCDR1 is a substitution to an amino acid selected from: A, F, H, K, R, W, and Y at the first position, F, I, and L at the second position, and/or A, D, E, I, L, M, S, and T at the fifth position; the variant of HCDR2 is a substitution to an amino acid selected from: G and M at the first position, I and V at the sixth position, F, H, K, L, M, N, S, V, W, and Y at the tenth position, and/or A, E, I, K, L, M, N, Q, R, S, and T at the eleventh position; the variant of HCDR3 is a substitution to an amino acid selected from: A, F, H, I, K, L, M, N, Q, R, and T at the second position; T at the fifth position; E, G, W and Y at the seventh position; L and T at the eighth position; A, E, G, H, I, L, M, Q, S and V; at the seventeenth position; and/or I, K, Q, S, T and V at the eighteenth position; the variant of LCDR1 is a substitution to an amino acid selected from: H, I, K, M, Q, T and V at the first position; F, G, H, I, K, L, M, N, Q, R, T, V and W at the fourth position; G at the fifth position; K at the sixth position, and/or F, K, T, V, and W at the seventh position; the variant of LCDR2 is a substitution to an amino acid selected from: I and S at the first position; G, N, and S at the second position; F, H, K, R, S, T, W and Y at the third position; and/or R at the fourth position; and the variant of LCDR3 is a substitution to an amino acid selected from: G at the second position; L, S and Y at the third position; N and T at the fourth position; D, F, G, H, K, and L at the fifth position; G, H, K, L, N, R and T at the sixth position; A, D, E, G, H, I, K, N, Q, R, S, T and Y at the eighth position; A, G, I, P and V at the ninth position; and/or A, M, S and T at the tenth position.

In embodiments, the antibody or antibody format, or fragment thereof, further comprises variable region framework (FW) sequences juxtaposed between the CDRs according to the formula (FW1)-(CDR1)-(FW2)-(CDR2)-(FW3)-(CDR3)-(FW4), wherein the variable region FW sequences in the heavy chain variable region are heavy chain variable region FW sequences, and wherein the variable region FW sequences in the light chain variable region are light chain variable region FW sequences.

In embodiments, the variable region FW sequences are human.

In embodiments, the antibody comprises human heavy chain and light chain constant regions.

In embodiments, the constant regions are selected from IgG1, IgG2, IgG3, and IgG4.

In embodiments, the antibody comprises: (i) a heavy chain variable region sequence comprising the amino acid sequence set forth in SEQ ID NO: 7, or the amino acid sequence of SEQ ID NO: 7 having at least 90% identity thereto; and (ii) a light chain variable region sequence comprising the amino acid sequence of SEQ ID NO: 8, or the amino acid sequence of SEQ ID NO: 8 having at least 90% identity thereto.

In embodiments, the antibody comprises an amino acid sequence having at least 95% with SEQ ID NO: 7 and/or SEQ ID NO. 8.

In embodiments, the antibody comprises an amino acid sequence having at least 98% with SEQ ID NO: 7 and/or SEQ ID NO. 8.

In embodiments, the antibody is a monoclonal antibody.

In embodiments, the antibody is selected from a single-chain antibody (scFv), Fv, Fab, Fab', and F(ab')2. In embodiments, disclosed herein is a polynucleotide comprising a nucleic acid sequence encoding the antibody of any one of the embodiments herein.

In embodiments, disclosed herein is a vector comprising the polynucleotide of any one of the embodiments herein.

In embodiments, disclosed herein is a host cell comprising the vector of any one of the embodiments herein.

In embodiments, disclosed herein is a pharmaceutical composition comprising the antibody of any one of the embodiments herein, and a pharmaceutically acceptable excipient.

In embodiments, disclosed herein is a method of treating a disease in a subject, the method comprising administering to the subject the antibody the pharmaceutical composition of any one of the embodiments herein.

In embodiments, disclosed herein is a method of treating cancer in a subject, the method comprising administering to the subject the pharmaceutical composition of any one of the embodiments herein.

In embodiments, the antibody or antibody variants disclosed herein bind to GPRC5D. In embodiments, the antibody or antibody variants disclosed herein target GPRC5D. In embodiments, the antibody or antibody variants disclosed herein forms a complex with GPRC5D. In embodiments, the antibody or antibody variants disclosed herein associates with GPRC5D. In embodiments, the antibody or antibody variants disclosed herein interacts with GPRC5D. In embodiments, the antibody or antibody variants disclosed herein are suitable for binding to GPRC5D. In embodiments, the antibody or antibody variants disclosed herein are suitable for targeting GPRC5D. In embodiments, the antibody or antibody variants disclosed herein are capable of binding to GPRC5D. In embodiments, the antibody or antibody variants disclosed herein are capable of targeting GPRC5D.

In embodiments, the terms and phrases "target", "forms a complex", "associates", "interacts", "suitable for binding", "capable of binding", and "capable of targeting" are used interchangeably herein.

It will also be understood that, although the terms first, second, etc., may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject. Furthermore, the terms "subject," "user," and "patient" are used interchangeably herein.

As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features. Although the open-ended term "comprising," as a synonym of terms such as including, containing, or having, is used herein to describe and claim the disclosure, the present technology, or embodiments thereof, may alternatively be described using more limiting terms such as "consisting of" or "consisting essentially of" the recited ingredients.

Unless defined otherwise, all technical and scientific terms herein have the same meaning as commonly understood by one of ordinary skill in the art to which this disclosure belongs. Although any methods and materials, similar or equivalent to those described herein, can be used in the practice or testing of the present disclosure, the preferred methods and materials are described herein. All publications, patents, and patent publications cited are incorporated by reference herein in their entirety for all purposes.

This disclosure is further illustrated by the following non-limiting examples.

EXAMPLES

Example 1: Comprehensive Mutagenesis of the 24D02 Antibody

The experiments in this example describe the comprehensive mutagenesis of the antibody 24D02, specifically binding to the heavy chain (HC) and light chain (LC) CDRs of CDR1-3. The antibody in this experiment was formatted as a monovalent single-chain variable fragment (scFv), providing a concise construct for binding the antigen. In this experiment, comprehensive mutagenesis was performed, which involved testing all possible single amino acid substitutions at each position within the CDRs. In total, 19 substitutions at each residue were tested, resulting in a nearly complete mutation coverage of 93% (986 out of 1064 possible variants). This extensive approach allowed for a thorough examination of which specific amino acid changes can enhance or alter the antibody's binding affinity for the GPRC5D antigen.

To facilitate the expression of these variants, *E. coli* was used as the expression system, and the bacterial periprep method was employed to extract the expressed scFvs. The screening of variants for improved binding to the GPRC5D protein was conducted using enzyme-linked immunosorbent assay (ELISA). Through this method, the binding of the mutated scFvs to the GPRC5D antigen were assessed in a high-throughput manner, enabling the identification of variants that exhibit comparable or superior binding properties compared to the parental antibody.

FIG. 1A and FIG. 1B are graphs showing the binding and expression levels of alanine mutations introduced across the complementarity-determining regions (CDRs) of an antibody. By substituting individual amino acids with alanine, the experiments of this example were able to identify residues that contribute to binding—collectively referred to as the "paratope"—as well as other important residues within the CDRs. Existing alanine residues were changed to serine for analysis. After cloning and expressing the resultant mutations, the binding and expression levels of each alanine mutation were quantified. This systematic approach enables a comprehensive understanding of which residues are essential for effective binding, thereby informing future antibody development efforts.

Figure 2B:
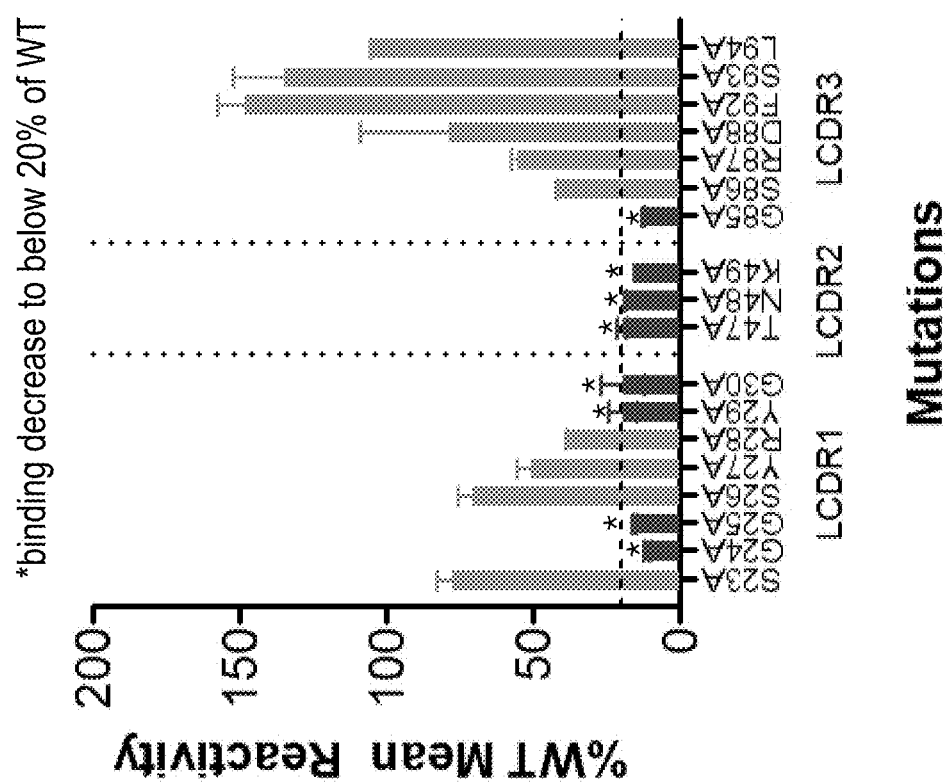

FIG. 2A and FIG. 2B are graphs showing the identification of residues that constitute the paratope. Alanine substitutions were utilized to assess the impact of individual residues on binding. Binding levels for each variant were measured in duplicate and then normalized to the wild-type (WT) antibody reactivity, with WT defined as 100% for both expression and binding. Mutations that maintained expression levels greater than 20% of the WT antibody, yet exhibited a binding decrease to below 20% of WT are shown in the figure. This identification of residues provided insight into the structural and functional integrity of the antibody, establishing a foundation for targeted modifications to improve binding efficacy in future therapeutic applications.

TABLE 1

Identification of residues that define the paratope. Binding levels of each variant were measured in duplicate and normalized to expression levels using a dilution curve of wild type (WT) antibody. Binding was then normalized to % WT antibody reactivity (defined as 100%). Mutations that caused loss of binding (<20% WT) were identified. The range of the replicate % WT values is listed for each clone. The CDR residues identified here define the common structural feature of the genus of antibodies.

| HC CDR | Parental Residue | Variant | % WT Binding | ± Range |
|---|---|---|---|---|
| HCDR1 | Y154 | Y154A | 11.7 | 0.6 |
| HCDR1 | G155 | G155A | 8.6 | 0.7 |

TABLE 1-continued

| HCDR2 | G172 | G172A | 8.2 | 1.0 |
|---|---|---|---|---|
| HCDR2 | N175 | N175A | 4.9 | 0.1 |
| HCDR2 | T176 | T176A | 6.2 | 1.1 |
| HCDR3 | P221 | P221A | 4.6 | 0.0 |
| HCDR3 | C223 | C223A | 14.8 | 1.8 |
| HCDR3 | R226 | R226A | 8.8 | 1.2 |
| HCDR3 | D228 | D228A | 10.4 | 0.5 |
| HCDR3 | C229 | C229A | 10.5 | 0.8 |
| HCDR3 | W230 | W230A | 6.8 | 0.4 |
| HCDR3 | Y231 | Y231A | 6.5 | 1.1 |
| HCDR3 | S232 | S232A | 14.8 | 3.2 |
| HCDR3 | A233 | A233S | 15.1 | 0.7 |
| HCDR3 | I236 | I236A | 14.3 | 5.5 |

| LC CDR | Parental Residue | Variant | % WT Binding | ± Range |
|---|---|---|---|---|
| LCDR1 | G24 | G24A | 11.0 | 1.0 |
| LCDR1 | G25 | G25A | 15.1 | 0.5 |
| LCDR1 | Y29 | Y29A | 19.1 | 4.6 |
| LCDR1 | G30 | G30A | 19.3 | 7.3 |
| LCDR2 | T47 | T47A | 19.5 | 1.8 |
| LCDR2 | N48 | N48A | 18.5 | 0.1 |
| LCDR2 | K49 | K49A | 15.6 | 0.0 |
| LCDR3 | G85 | G85A | 12.1 | 0.2 |

TABLE 2

Identification of permissible CDR substitutions. Binding of each variant was measured in duplicate and normalized to expression levels using a dilution curve of wild type (WT) antibody. Binding was then normalized to % WT antibody reactivity (defined as 100%). Permissible mutations that retained WT binding (>20% WT) are shown in BOLD. Mutations that caused an increase of binding (>200% WT) were identified and are shown in Underline. "ND" indicates there is no data available because the mutation was not created. "NE" indicates a clone was screened, but expression was too low to analyze binding. A clone was considered to be expressed if the expression value was greater than five times the background expression level.

| HC CDR | Parental Residue | A | C | D | E | F | G | H | I | K | L | M | N | P | Q | R | S | T | V | W | Y |
|---|---|---|---|---|---|---|---|---|---|---|---|---|---|---|---|---|---|---|---|---|---|
| | | | | | | | | HC % WT Binding Reactivities | | | | | | | | | | | | | |
| HCDR1 | S153 | 82 | 10 | 29 | 37 | 99 | 74 | 177 | 36 | 114 | 28 | 63 | ND | 11 | 71 | 84 | 103 | 54 | 39 | 126 | 128 |
| HCDR1 | Y154 | 12 | 12 | 8 | 7 | 127 | 20 | 16 | 152 | 59 | 113 | 73 | 56 | 8 | 25 | 19 | 12 | 28 | 68 | 11 | 102 |
| HCDR1 | G155 | 9 | 10 | 6 | 6 | 8 | 106 | 7 | 9 | 9 | 9 | 8 | 9 | 6 | 7 | 7 | 6 | 7 | 7 | 7 | 11 |
| HCDR1 | G157 | <u>219</u> | 32 | 148 | 83 | 13 | 114 | 28 | <u>223</u> | 39 | <u>236</u> | 177 | ND | 20 | 30 | 9 | 151 | 91 | 72 | 8 | 8 |
| HCDR2 | A171 | 82 | 15 | 7 | 7 | 15 | 142 | 8 | 36 | 11 | 67 | 119 | 25 | 9 | 22 | 17 | 57 | 36 | 48 | 8 | 11 |
| HCDR2 | G172 | 8 | 8 | 3 | 5 | 11 | 106 | 6 | 8 | 11 | 8 | ND | 7 | 5 | 6 | 6 | 6 | 6 | 7 | 7 | 8 |
| HCDR2 | I173 | 25 | 21 | 9 | 25 | 7 | 47 | 19 | 103 | 6 | ND | 78 | ND | 6 | 40 | 7 | 33 | 46 | 76 | 10 | 8 |
| HCDR2 | D174 | 29 | 34 | 137 | 9 | 7 | 15 | 8 | 6 | 8 | 7 | 12 | 23 | 6 | 7 | 7 | 14 | 13 | 7 | 7 | 6 |
| HCDR2 | N175 | 5 | 8 | 5 | 4 | 6 | 6 | 6 | 5 | 7 | 6 | 9 | 99 | 5 | 5 | 6 | 6 | 5 | 5 | 5 | 6 |
| HCDR2 | T176 | 6 | 27 | 5 | 5 | 8 | 9 | 10 | 101 | 10 | 18 | ND | 13 | 8 | ND | 9 | 9 | 124 | 106 | 25 | 8 |
| HCDR2 | G177 | 48 | 9 | 11 | 8 | 6 | 106 | 11 | 7 | 11 | 10 | 16 | ND | 6 | 20 | 11 | 61 | 28 | 9 | 9 | 10 |
| HCDR2 | R178 | 22 | 7 | 4 | 6 | 12 | 58 | 65 | 25 | 45 | 31 | 28 | 42 | 8 | ND | 93 | 43 | 18 | 18 | 16 | 13 |
| HCDR2 | Y179 | ND | 9 | 5 | 3 | 42 | 12 | 40 | 6 | 7 | 8 | 18 | ND | ND | 11 | 7 | 15 | ND | 7 | 14 | 132 |
| HCDR2 | T180 | 70 | 42 | 68 | 49 | 127 | 25 | 112 | 79 | 102 | 99 | 122 | 138 | 12 | 78 | 58 | 115 | 107 | 91 | 157 | 154 |
| HCDR2 | G181 | 122 | 30 | 25 | 81 | 46 | 105 | 77 | 165 | <u>264</u> | 193 | <u>237</u> | 170 | 10 | 176 | <u>233</u> | 186 | 157 | 77 | 8 | 38 |
| HCDR3 | P221 | 5 | 13 | 7 | 8 | 6 | 6 | 7 | 7 | 4 | 6 | <u>10</u> | 14 | 107 | 6 | <u>8</u> | ND | 7 | 7 | 6 | 5 |
| HCDR3 | T222 | 187 | 44 | 11 | 15 | 178 | 19 | 198 | <u>211</u> | 175 | 189 | <u>286</u> | 96 | 10 | 98 | 188 | 140 | 137 | 17 | 40 | ND |

TABLE 2-continued

Identification of permissible CDR substitutions. Binding of each variant was measured in duplicate and normalized to expression levels using a dilution curve of wild type (WT) antibody. Binding was then normalized to % WT antibody reactivity (defined as 100%). Permissible mutations that retained WT binding (>20% WT) are shown in BOLD. Mutations that caused an increase of binding (>200% WT) were identified and are shown in Underline. "ND" indicates there is no data available because the mutation was not created. "NE" indicates a clone was screened, but expression was too low to analyze binding. A clone was considered to be expressed if the expression value was greater than five times the background expression level.

| HC CDR | Parental Residue | A | C | D | E | F | G | H | I | K | L | M | N | P | Q | R | S | T | V | W | Y |
|---|---|---|---|---|---|---|---|---|---|---|---|---|---|---|---|---|---|---|---|---|---|
| HCDR3 | C223 | 15 | 112 | 15 | 11 | 17 | 12 | 13 | 11 | 15 | 15 | 14 | 13 | 14 | 11 | 19 | 12 | 12 | 11 | 11 | 13 |
| HCDR3 | S224 | 53 | 16 | 17 | 54 | 27 | 36 | 57 | 21 | ND | 67 | 52 | 32 | 7 | 36 | 77 | 115 | 77 | 23 | 25 | 37 |
| HCDR3 | G225 | 38 | 10 | 10 | 18 | 7 | 92 | 11 | 12 | 12 | 8 | 28 | 25 | ND | 21 | 35 | 80 | 116 | 11 | 7 | 8 |
| HCDR3 | R226 | 9 | 14 | 5 | 4 | 6 | 5 | 7 | 26 | 15 | 12 | 9 | 6 | 15 | 6 | 105 | 6 | ND | 17 | 5 | 5 |
| HCDR3 | D227 | 26 | 26 | 103 | 99 | 33 | 125 | 37 | 7 | 13 | 10 | 12 | 15 | 7 | 10 | 14 | 21 | 9 | 7 | 139 | 125 |
| HCDR3 | D228 | 10 | 14 | 116 | 44 | 9 | 11 | 11 | 26 | 15 | 108 | 51 | 14 | 9 | 24 | 20 | 25 | 169 | 64 | 10 | 13 |
| HCDR3 | C229 | 10 | 132 | 13 | 14 | 10 | 13 | 15 | 11 | 1C | 9 | 17 | 19 | 11 | ND | 13 | 9 | 8 | 18 | 9 | 9 |
| HCDR3 | W230 | 7 | 16 | 5 | 15 | 7 | 7 | 7 | 6 | 7 | 6 | 10 | 7 | 9 | 3 | 6 | 7 | 6 | 5 | 106 | 6 |
| HCDR3 | Y231 | 6 | 11 | 9 | 5 | 11 | 8 | 9 | 6 | 6 | 7 | 8 | 7 | 7 | 5 | 7 | ND | 13 | 5 | 8 | 93 |
| HCDR3 | S232 | 15 | 13 | 4 | 12 | 7 | 13 | 12 | 8 | 9 | 5 | 10 | 10 | 10 | 24 | 22 | 119 | ND | 12 | 10 | 12 |
| HCDR3 | A233 | 118 | 16 | 6 | 13 | 9 | 17 | 9 | 9 | 11 | 9 | 20 | 11 | 8 | 9 | 15 | 15 | 15 | 14 | 7 | 8 |
| HCDR3 | A234 | 148 | ND | ND | 4 | 13 | 44 | 13 | 12 | 11 | 10 | 8 | 8 | 11 | 9 | 13 | 57 | 10 | 8 | 8 | 7 |
| HCDR3 | G235 | 33 | 8 | 5 | 4 | 11 | 132 | 6 | 6 | 7 | 6 | 7 | ND | 6 | 5 | 8 | 32 | 4 | 3 | 12 | 7 |
| HCDR3 | I236 | 14 | 7 | 10 | 11 | 38 | 7 | 17 | 129 | 9 | ND | ND | 9 | ND | 35 | ND | 14 | 10 | 41 | 9 | 32 |
| HCDR3 | D237 | 128 | 50 | 101 | 154 | 44 | 97 | 229 | 249 | ND | 152 | 102 | ND | 21 | 264 | 77 | 97 | 77 | 152 | 21 | 68 |
| HCDR3 | A238 | 81 | ND | 16 | 67 | 28 | 69 | ND | 131 | 256 | 57 | 62 | 64 | ND | 152 | 66 | 131 | 158 | 145 | ND | 42 |
| | | | | | | | | | LC % WT Binding Reactivities | | | | | | | | | | | | |
| LCDR1 | S23 | 77 | 14 | 44 | 69 | 63 | 36 | 94 | 96 | 102 | 59 | 82 | 57 | 10 | 86 | 79 | 101 | 101 | 85 | 59 | 76 |
| LCDR1 | G24 | 11 | 9 | 9 | 9 | 10 | 99 | 11 | 9 | 11 | 10 | 9 | 13 | 9 | 8 | 12 | 11 | 10 | 10 | 10 | 9 |
| LCDR1 | G25 | 15 | 10 | 10 | ND | 15 | 83 | 14 | 12 | 17 | 13 | 18 | 15 | 23 | 19 | 30 | 38 | 28 | 47 | 14 | 16 |
| LCDR1 | S26 | 71 | 17 | 30 | 49 | 82 | 81 | 144 | 115 | 82 | 112 | 83 | 107 | 65 | 137 | 99 | 98 | 124 | 169 | 83 | 78 |
| LCDR1 | Y27 | 51 | 11 | 22 | ND | 57 | 128 | 64 | 38 | 33 | 49 | 43 | ND | 14 | 34 | 40 | 62 | 50 | 40 | 51 | 95 |
| LCDR1 | R28 | 38 | 7 | 3 | 4 | 9 | 55 | 21 | 33 | 95 | 24 | 22 | 29 | 6 | 21 | 81 | 52 | 33 | 24 | 9 | 14 |
| LCDR1 | Y29 | 19 | 14 | 22 | 18 | 90 | ND | 27 | 36 | 192 | 15 | 43 | 13 | 21 | 28 | 23 | ND | 121 | 122 | 147 | 107 |
| LCDR1 | G30 | 19 | 9 | 9 | 15 | 15 | 131 | 13 | 13 | 12 | 12 | 14 | 11 | 14 | 13 | 23 | 26 | 17 | 15 | 15 | 13 |
| LCDR2 | G46 | ND | 10 | 10 | 6 | 19 | 124 | 17 | 82 | 60 | 16 | 13 | 72 | 26 | 17 | 62 | 179 | ND | 28 | 6 | ND |
| LCDR2 | T47 | 20 | 10 | 36 | 20 | 19 | 91 | 36 | 24 | 26 | 20 | 14 | 101 | 13 | 18 | 40 | 150 | 129 | 28 | 21 | 14 |
| LCDR2 | N48 | 19 | 23 | 50 | ND | 105 | 51 | 112 | 34 | 85 | 19 | 22 | 93 | 13 | 32 | 130 | 141 | 92 | 57 | 160 | 151 |
| LCDR2 | K49 | 16 | 10 | 12 | ND | 27 | 25 | 67 | 20 | 116 | 22 | 20 | 39 | 10 | 38 | 86 | 42 | ND | 30 | 14 | 20 |
| LCDR3 | G85 | 12 | ND | 12 | 12 | 28 | 126 | 16 | 14 | 12 | 13 | 13 | 10 | 12 | ND | ND | ND | 15 | 14 | 15 | 20 |
| LCDR3 | S86 | 41 | 10 | 12 | 25 | ND | 103 | 23 | 32 | 28 | 30 | ND | 16 | 16 | 24 | 23 | 166 | 40 | 18 | 20 | 14 |
| LCDR3 | R87 | 55 | 12 | 5 | ND | ND | 42 | 59 | 63 | ND | 87 | ND | ND | ND | 36 | 107 | 91 | 36 | 63 | 63 | 90 |
| LCDR3 | D88 | 79 | 20 | ND | 26 | 31 | 63 | ND | 20 | 51 | 27 | 39 | 135 | 40 | ND | 44 | ND | 107 | 25 | 29 | 42 |
| LCDR3 | S89 | ND | ND | 95 | 67 | 95 | 110 | 131 | 59 | 90 | 85 | ND | ND | ND | ND | ND | ND | ND | 68 | 57 | 70 |
| LCDR3 | S90 | ND | 22 | 71 | 78 | 66 | 82 | 118 | 48 | 142 | 81 | ND | 98 | 15 | ND | 161 | 127 | 111 | 52 | 48 | 75 |
| LCDR3 | Y91 | ND | ND | 13 | 19 | 51 | 30 | 40 | 16 | 27 | 40 | ND | 29 | 11 | 27 | 35 | 53 | 45 | 19 | 29 | 105 |
| LCDR3 | F92 | 148 | 66 | 89 | 107 | 90 | 113 | 189 | 186 | 113 | ND | ND | 172 | 17 | 142 | 147 | 175 | 198 | ND | 55 | 136 |
| LCDR3 | S93 | 135 | 59 | 11 | 8 | ND | 201 | ND | 80 | 24 | 26 | 13 | ND | 265 | ND | 17 | 103 | 22 | 163 | ND | 8 |
| LCDR3 | L94 | 104 | 30 | 10 | 13 | 23 | 25 | 48 | 53 | 41 | 138 | 183 | 73 | 16 | 54 | 49 | 103 | 121 | ND | 37 | 30 |

ND = No data
NE = No expression

TABLE 3

Identification of permissible CDR variants. CDR variants that retained binding reactivity (>20% WT) were identified. Mutations indicated by an asterisk (*) may introduce post-translational modifications that have deleterious effects on antibody function, such as the addition of glycosylation sites, hydrolysis sites, and other modifications described below.

| HC CDR | Parental residue | Permissible variants |
|---|---|---|
| HCDR1 | S153 | Ala, Asp, Glu, Phe, Gly, His, Ile, Lys, Leu, Met, Gln, Arg, Thr, Val, Trp, Tyr |
| HCDR1 | Y154 | Phe, Gly, Ile, Lys, Leu, Met, Asn*, Gln, Thr, Val |
| HCDR1 | G155 | (parental only) |
| HCDR1 | G157 | Ala, Cys, Asp, Glu, His, Ile, Lys, Leu, Met, Pro, Gln, Ser, Thr, Val |
| HCDR2 | A171 | Gly, Ile, Leu, Met, Asn*, Gln, Ser, Thr, Val |
| HCDR2 | G172 | (parental only) |
| HCDR2 | I173 | Ala, Cys, Glu, Gly, Met, Gln, Ser, Thr, Val |

TABLE 3-continued

| HC CDR | Parental residue | Permissible variants |
|---|---|---|
| HCDR2 | D174 | Ala, Cys, Asn* |
| HCDR2 | N175 | (parental only) |
| HCDR2 | T176 | Cys, Ile, Val, Trp |
| HCDR2 | G177 | Ala, Ser*, Thr* |
| HCDR2 | R178 | Ala, Gly, His, Ile, Lys, Leu, Met, Asn*, Ser |
| HCDR2 | Y179 | Phe, His |
| HCDR2 | T180 | Ala, Cys, Asp*, Glu, Phe, Gly, His, Ile, Lys, Leu, Met, Asn*, Gln, Arg, Ser, Val, Trp, Tyr |
| HCDR2 | G181 | Ala, Cys, Asp, Glu, Phe, His, Ile, Lys, Leu, Met, Asn, Gln, Arg, Ser, Thr, Val, Tyr |
| HCDR3 | P221 | (parental only) |
| HCDR3 | T222 | Ala, Cys, Phe, His, Ile, Lys, Leu, Met, Asn*, Gln, Arg, Ser, Trp |
| HCDR3 | C223 | (parental only) |
| HCDR3 | S224 | Ala, Glu, Phe, Gly, His, Ile, Leu, Met, Asn*, Gln, Arg, Thr, Val, Trp, Tyr |
| HCDR3 | G225 | Ala, Met, Asn, Gln, Arg, Ser, Thr |
| HCDR3 | R226 | Ile |
| HCDR3 | D227 | Ala, Cys, Glu, Phe, Gly, His, Ser, Trp, Tyr |
| HCDR3 | D228 | Glu, Ile, Leu, Met, Gln, Arg, Ser, Thr, Val |
| HCDR3 | C229 | (parental only) |

TABLE 3-continued

| | | |
|---|---|---|
| HCDR3 | W230 | (parental only) |
| HCDR3 | Y231 | (parental only) |
| HCDR3 | S232 | Gln, Arg |
| HCDR3 | A233 | (parental only) |
| HCDR3 | A234 | Gly, Ser |
| HCDR3 | G235 | Ala, Ser |
| HCDR3 | I236 | Phe, Gln, Val, Tyr |
| HCDR3 | D237 | Ala, Cys, Glu, Phe, Gly, His, Ile, Leu, Met, Pro, Gln, Arg, Ser, Thr, Val, Trp, Tyr |
| HCDR3 | A238 | Glu, Phe, Gly, Ile, Lys, Leu, Met, Asn, Gln, Arg, Ser, Thr, Val, Tyr |

| LC CDR | Parental residue | Permissible variants |
|---|---|---|
| LCDR1 | S23 | Ala, Asp*, Glu, Phe, Gly, His, Ile, Lys, Leu, Met, Asn*, Gln, Arg, Thr, Val, Trp, Tyr |
| LCDR1 | G24 | (parental only) |
| LCDR1 | G25 | Pro, Arg, Ser, Thr, Val |
| LCDR1 | S26 | Ala, Asp, Glu, Phe, Gly, His, Ile, Lys, Leu, Met, Asn, Pro, Gln, Arg, Thr, Val, Trp, Tyr |
| LCDR1 | Y27 | Ala, Asp, Phe, Gly, His, Ile, Lys, Leu, Met, Gln, Arg, Ser, Thr, Val, Trp |
| LCDR1 | R28 | Ala, Gly, His, Ile, Lys, Leu, Met, Asn, Gln, Ser, Thr, Val |
| LCDR1 | Y29 | Asp*, Phe, His, Ile, Lys, Met, Pro, Gln, Arg, Thr, Val, Trp |
| LCDR1 | G30 | Arg, Ser |
| LCDR2 | G46 | Ile, Lys, Asn, Pro, Arg, Ser, Val |
| LCDR2 | T47 | Asp, Glu, Gly, His, Ile, Lys, Asn, Arg, Ser, Val, Trp |
| LCDR2 | N48 | Cys, Asp, Phe, Gly, His, Ile, Lys, Met, Gln, Arg, Ser, Thr, Val, Trp, Tyr |
| LCDR2 | K49 | Phe, Gly*, His, Leu, Met, Asn, Gln, Arg, Ser, Val, Tyr |
| LCDR3 | G85 | Phe, Tyr |
| LCDR3 | S86 | Ala, Glu, Gly, His, Ile, Lys, Leu, Gln, Arg, Thr |
| LCDR3 | R87 | Ala, Gly, His, Ile, Leu, Gln, Ser, Thr, Val, Trp, Tyr |
| LCDR3 | D88 | Ala, Cys, Glu, Phe, Gly, Lys, Leu, Met, Asn*, Pro, Arg, Thr, Val, Trp, Tyr |
| LCDR3 | S89 | Asp, Glu, Phe, Gly, His, Ile, Lys, Leu, Val, Trp, Tyr |
| LCDR3 | S90 | Cys, Asp, Glu, Phe, Gly, His, Ile, Lys, Leu, Asn, Arg, Thr, Val, Trp, Tyr |
| LCDR3 | Y91 | Phe, Gly, His, Lys, Leu, Asn*, Gln, Arg, Ser, Thr, Trp |
| LCDR3 | F92 | Ala, Cys, Asp, Glu, Gly, His, Ile, Lys, Asn, Gln, Arg, Ser, Thr, Trp, Tyr |
| LCDR3 | S93 | Ala, Cys, Gly, Ile, Lys, Leu, Pro, Thr, Val |
| LCDR3 | L94 | Ala, Cys, Phe, Gly, His, Ile, Lys, Met, Asn, Gln, Arg, Ser, Thr, Trp, Tyr |

TABLE 4

Identification of improved CDR variants. CDR variants that enhance binding reactivity (>200% WT) were identified.

| CDR | Residue | Variants with improved binding |
|---|---|---|
| HC CDR | | |
| HCDR1 | G157 | Ala, Ile, Leu |
| HCDR2 | G181 | Lys, Met, Arg |
| HCDR3 | T222 | Ile, Met |
| HCDR3 | D237 | His, Ile, Gln |
| HCDR3 | A238 | Lys |
| LC CDR | | |
| LCDR3 | S93 | Gly, Pro |

TABLE 5

Identification of permissible histidine variants. Histidine variants that retained WT binding reactivity were identified. Since histidine residues can be used to engineer antibody pH sensitivity, histidine mutations may be of interest in antibody engineering.

| HC CDR | CDR residues with permissible His mutations |
|---|---|
| HCDR1 | S153, G157 |
| HCDR2 | R178, Y179, T180, G181 |
| HCDR3 | T222, S224, D227, D237 |
| LC CDR | |
| LCDR1 | S23, S26, Y27, R28, Y29 |
| LCDR2 | T47, N48, K49 |
| LCDR3 | S86, R87, S89, S90, Y91, F92, L94 |

TABLE 6

Identification of substitutions to reduce polyreactivity risk. Arginine residues can contribute to the risk of non-specific binding or 'polyreactivity'. Permissible substitutions of arginine residues were identified.

| CDR | Residue | Permissible substitutions of Arg residues |
|---|---|---|
| HC CDR | | |
| CDR2 | R178 | Ala, Gly, His, Ile, Lys, Leu, Met, Asn, Ser |
| CDR3 | R226 | Ile |
| LC CDR | | |
| CDR1 | R28 | Ala, Gly, His, Ile, Lys, Leu, Met, Asn, Gln, Ser, Thr, Val |
| CDR3 | R87 | Ala, Gly, His, Ile, Leu, Gln, Ser, Thr, Val, Trp, Tyr |

OTHER EMBODIMENTS

It is to be understood that while the disclosure has been described in conjunction with the detailed description thereof, the foregoing description is intended to illustrate and not limit the scope of the disclosure, which is defined by the scope of the appended claims. Other aspects, advantages, and modifications are within the scope of the following claims.

INCORPORATION BY REFERENCE

All patents and publications referenced herein are hereby incorporated by reference in their entireties.

The publications discussed herein are provided solely for their disclosure prior to the filing date of the present application. Nothing herein is to be construed as an admission that the present invention is not entitled to antedate such publication by virtue of prior invention.

As used herein, all headings are simply for organization and are not intended to limit the disclosure in any way.

What is claimed is:

1. An antibody that binds to GPRC5D comprising:

(a) a heavy chain variable region comprising a HCDR1 comprising the amino acid sequence of SYGMG (SEQ ID NO: 4) or a variant thereof; a HCDR2 comprising the amino acid sequence of AGIDNTGRYTGYGSAVKG (SEQ ID NO: 5) or a variant thereof; a HCDR3 comprising the amino acid sequence of PTCSGRDDCWYSAAGIDA (SEQ ID NO: 6) or a variant thereof; and (b) a light chain variable region comprising a LCDR1 comprising the amino acid sequence of SGGSYRYG (SEQ ID NO: 1) or a variant thereof; a LCDR2 comprising the amino acid sequence of GTNKRPS (SEQ ID NO: 2) or a variant thereof; and a LCDR3 comprising the amino acid sequence of GSRDSSYFSL (SEQ ID NO: 3) or a variant thereof, wherein:
- (i) the variant of HCDR1 is a substitution to an amino acid selected from: A, F, H, K, R, W, and Y at the first position, F, I, and L at the second position, and/or A, D, E, I, L, M, S, and T at the fifth position;
- (ii) the variant of HCDR2 is a substitution to an amino acid selected from: G and M at the first position, I and V at the sixth position, F, H, K, L, M, N, S, V, W, and Y at the tenth position, and/or A, E, I, K, L, M, N, Q, R, S, and T at the eleventh position;
- (iii) the variant of HCDR3 is a substitution to an amino acid selected from: A, F, H, I, K, L, M, N, Q, R, and T at the second position; T at the fifth position; E, G, W and Y at the seventh position; L and T at the eighth position; A, E, G, H, I, L, M, Q, S and V; at the seventeenth position; and/or I, K, Q, S, T and V at the eighteenth position;
- (iv) the variant of LCDR1 is a substitution to an amino acid selected from: H, I, K, M, Q, T and V at the first position; F, G, H, I, K, L, M, N, Q, R, T, V and W at the fourth position; G at the fifth position; K at the sixth position, and/or F, K, T, V and W at the seventh position;
- (v) the variant of LCDR2 is a substitution to an amino acid selected from: I and S at the first position; G, N, and S at the second position; F, H, K, R, S, T, W and Y at the third position; and/or R at the fourth position; and
- (vi) the variant of LCDR3 is a substitution to an amino acid selected from: G at the second position; L, S and Y at the third position; N and T at the fourth position; D, F, G, H, K, and L at the fifth position; G, H, K, L, N, R and T at the sixth position; A, D, E, G, H, I, K, N, Q, R, S, T and Y at the eighth position; A, G, I, P and V at the ninth position; and/or A, M, S and T at the tenth position.

2. The antibody of claim 1, wherein the antibody further comprises variable region framework (FW) sequences juxtaposed between the CDRs according to the formula (FW1)-(CDR1)-(FW2)-(CDR2)-(FW3)-(CDR3)-(FW4), wherein the variable region FW sequences in the heavy chain variable region are heavy chain variable region FW sequences, and wherein the variable region FW sequences in the light chain variable region are light chain variable region FW sequences.

3. The antibody of claim 2, wherein the variable region FW sequences are human.

4. The antibody of claim 1, wherein the antibody further comprises human heavy chain and light chain constant regions.

5. The antibody of claim 4, wherein the constant regions are selected from IgG1, IgG2, IgG3, and IgG4.

6. The antibody of claim 1, wherein the antibody comprises: (i) a heavy chain variable region sequence comprising the amino acid sequence set forth in SEQ ID NO: 7, or the amino acid sequence of SEQ ID NO: 7 having at least 95% identity thereto; and (ii) a light chain variable region sequence comprising the amino acid sequence of SEQ ID NO: 8, or the amino acid sequence of SEQ ID NO: 8 having at least 95% identity thereto.

7. The antibody of claim 1, wherein the antibody comprises an amino acid sequence having at least 97% identity with SEQ ID NO: 7 and/or SEQ ID NO. 8.

8. The antibody of claim 1, wherein the antibody comprises an amino acid sequence having at least 98% identity with SEQ ID NO: 7 and/or SEQ ID NO. 8.

9. The antibody of claim 1, wherein the antibody is a monoclonal antibody.

10. The antibody of claim 1, wherein the antibody is selected from a single-chain variable fragment (scFv), Fv, Fab, Fab', and F(ab') 2.

11. A polynucleotide comprising a nucleic acid sequence encoding the antibody of claim 1.

12. A vector comprising the polynucleotide of claim 11.

13. A host cell comprising the vector of claim 12.

14. A pharmaceutical composition comprising the antibody of claim 1, and a pharmaceutically acceptable excipient.

* * * * *

```
                               SEQUENCE LISTING

Sequence total quantity: 8
SEQ ID NO: 1              moltype = AA   length = 8
FEATURE                   Location/Qualifiers
source                    1..8
                          mol_type = protein
                          organism = synthetic construct
SEQUENCE: 1
SGGSYRYG                                                                    8

SEQ ID NO: 2              moltype = AA   length = 7
FEATURE                   Location/Qualifiers
source                    1..7
                          mol_type = protein
                          organism = synthetic construct
SEQUENCE: 2
GTNKRPS                                                                     7

SEQ ID NO: 3              moltype = AA   length = 10
FEATURE                   Location/Qualifiers
source                    1..10
                          mol_type = protein
                          organism = synthetic construct
SEQUENCE: 3
GSRDSSYFSL                                                                 10

SEQ ID NO: 4              moltype = AA   length = 5
FEATURE                   Location/Qualifiers
source                    1..5
                          mol_type = protein
                          organism = synthetic construct
SEQUENCE: 4
SYGMG                                                                       5

SEQ ID NO: 5              moltype = AA   length = 18
FEATURE                   Location/Qualifiers
source                    1..18
                          mol_type = protein
                          organism = synthetic construct
SEQUENCE: 5
AGIDNTGRYT GYGSAVKG                                                        18

SEQ ID NO: 6              moltype = AA   length = 18
FEATURE                   Location/Qualifiers
source                    1..18
                          mol_type = protein
                          organism = synthetic construct
SEQUENCE: 6
PTCSGRDDCW YSAAGIDA                                                        18

SEQ ID NO: 7              moltype = AA   length = 127
FEATURE                   Location/Qualifiers
source                    1..127
                          mol_type = protein
                          organism = synthetic construct
SEQUENCE: 7
EVQLLESGGG LVQPGGSLRL SCAASGFTFS SYGMGWVRQA PGKGLEWVAG IDNTGRYTGY           60
GSAVKGRFTI SRDNSKNTLY LQMNSLRAED TAVYYCAKPT CSGRDDCWYS AAGIDAWGQG          120
TLVTVSS                                                                   127

SEQ ID NO: 8              moltype = AA   length = 104
FEATURE                   Location/Qualifiers
source                    1..104
                          mol_type = protein
                          organism = synthetic construct
SEQUENCE: 8
SYVLTQPPSV SVAPGKTARI TCSGGSYRYG WYQQKPGQAP VTVIYGTNKR PSGIPERFSG           60
SNSGNTATLT ISRVEAGDEA DYYCGSRDSS YFSLFGGGTK LTVL                           104
```